(12) United States Patent
Kwon et al.

(10) Patent No.: US 10,547,890 B2
(45) Date of Patent: Jan. 28, 2020

(54) APPARATUS AND METHOD FOR DISPLAYING USER INTERFACE

(71) Applicant: Samsung Electronics Co., Ltd., Gyeonggi-do (KR)

(72) Inventors: Eun Seon Kwon, Busan (KR); Soon Hyun Cha, Gyeonggi-do (KR); Jin Seub Eum, Gyeonggi-do (KR); Kyung Jin Cho, Gyeonggi-do (KR); Duck Young Chai, Gyeonggi-do (KR); Jong Hyuk Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 621 days.

(21) Appl. No.: 14/873,915

(22) Filed: Oct. 2, 2015

(65) Prior Publication Data

US 2016/0105540 A1     Apr. 14, 2016

(30) Foreign Application Priority Data

Oct. 2, 2014   (KR) ..................... 10-2014-0133476

(51) Int. Cl.
| *G06F 3/0484* | (2013.01) |
| *H04N 21/414* | (2011.01) |
| *H04M 1/725* | (2006.01) |
| *G06F 9/451* | (2018.01) |

(52) U.S. Cl.
CPC ....... *H04N 21/41407* (2013.01); *G06F 9/451* (2018.02); *H04M 1/72522* (2013.01)

(58) Field of Classification Search
CPC ...... G06F 3/04847; G06F 3/14; G06F 3/0481; G06F 3/0484
See application file for complete search history.

(56) References Cited

U.S. PATENT DOCUMENTS

| 5,963,206 | A | 10/1999 | Ulrich et al. | |
| 6,199,158 | B1 | 3/2001 | Hirsch | |
| 6,239,795 | B1 | 5/2001 | Ulrich et al. | |
| 6,466,228 | B1 | 10/2002 | Ulrich et al. | |
| 6,958,758 | B2 | 10/2005 | Ulrich et al. | |
| 2001/0001875 | A1 | 5/2001 | Hirsch | |
| 2003/0052921 | A1 | 3/2003 | Ulrich et al. | |
| 2012/0115542 | A1* | 5/2012 | Griffin | H04W 8/205 455/552.1 |
| 2012/0272231 | A1* | 10/2012 | Kwon | G06F 8/61 717/173 |
| 2015/0017962 | A1* | 1/2015 | Howard | H04W 8/22 455/418 |

* cited by examiner

*Primary Examiner* — Andrea C Leggett
(74) *Attorney, Agent, or Firm* — The Farrell Law Firm, P.C.

(57) ABSTRACT

An electronic device is provided. The electronic device includes a memory that is configured to store subscriber identity module (SIM) information corresponding to a communications service provider that provides a network. The SIM information is received, via the network, from an external device. A processor-implemented manager module is operatively connected to the memory and is configured to change, based on at least the SIM information, at least a part of a user interface to be displayed through a display operatively connected to the electronic device.

17 Claims, 27 Drawing Sheets

APPARATUS AND METHOD FOR DISPLAYING USER INTERFACE

PRIORITY

This application claims priority under 35 U.S.C. § 119(a) to Korean Patent Application Serial No. 10-2014-0133476 which was filed on Oct. 2, 2014 in the Korean Intellectual Property Office, the entire disclosure of which is incorporated herein by reference.

BACKGROUND

1. Field of the Disclosure

The present disclosure relates generally to a device and method for displaying a user interface on an electronic device, and more particularly to a device and method for displaying a user interface on an electronic device based on communication between the electronic device and a mobile network operator.

2. Description of the Related Art

With the development of a mobile communication technology, electronic, devices may perform not only a voice call function but also various data communication functions. Furthermore, various mobile network operators (MNOs) may provide a global roaming service so that a user may use a mobile communication service with a number assigned to the user anywhere in the world. For such a global roaming service, electronic devices, for example, mobile devices such as cell phones or tablets, may be equipped with a subscriber identification module (SIM) card that may store information related to a mobile network operator such as subscriber profile information. In the subscriber profile information, a file structure, data or an application related to a mobile network operator or various data related to a subscriber identification module may be packaged and installed in the form of software.

Applications for providing a network-based communication service may obtain the information stored in a subscriber identification module to use a network operated by a mobile network operator.

Since a method for displaying or executing various applications (e.g., a call application, a wireless Internet application, a short message service application, a multimedia message service application, a multimedia application, or the like) in an electronic device is determined at the time of manufacturing the electronic device or distributing the applications, it may not be easy for a user to change this method after purchasing the electronic device or downloading the applications. For example, in the case where the electronic device has information relating to a mobile network operator or subscriber identification module information, even if the information on a mobile network operator or a subscriber identification module is changed, a user interface or information displayed by the user interface may not be changed according to the information change. Even if the mobile network operator is changed, information on a previous mobile network operator may be provided to the user through a user interface. Therefore, the user may be unable to perform an operation set or desired by the user, and may experience difficulty in efficiently using services provided by the electronic device.

SUMMARY

The present disclosure has been made to address at least the above mentioned problems and/or disadvantages and to provide at least the advantages described below.

Accordingly, an aspect of the present disclosure is to provide a method and electronic device for managing a user interface displayed on an electronic device (e.g., a mobile terminal) based on communication between the electronic device and a mobile network operator (e.g., a server).

Another aspect of the present disclosure is to provide a method and electronic device for changing a user interface in an electronic device.

In accordance with an aspect of the present disclosure, there is provided an electronic device. The electronic device includes a memory configured to store SIM information corresponding to a communication service provider that provides a network. The SIM information received from an external device via the network. A processor-implemented manager module operatively connected to the memory and configured to change, based at least on the SIM information, at least a part of a user interface to be displayed through a display operatively connected to the electronic device.

In accordance with another aspect of the present disclosure, there is provided an electronic device. The electronic device includes a memory configured to store first SIM information and second SIM information. A processor-implemented manager module operatively connected to the memory and configured to provide communication between the electronic device and an external device based on at least one of the first SIM information or the second SIM information and display, based on the provided communication, at least one of first information corresponding to the first SIM information and second information corresponding to the second SIM information through a display operatively connected to the electronic device.

In accordance with another aspect of the present disclosure, there is provided a method. The method includes receiving a plurality of pieces of SIM information comprising first SIM information corresponding to a first user interface and second SIM information corresponding to a second user interface, presenting the first user interface through a display operatively connected to an electronic device, and changing at least a part of the first user interface to the second user interface based on the second SIM information, in response to a user input obtained for the first user interface.

DETAILED DESCRIPTION

Figure 1:
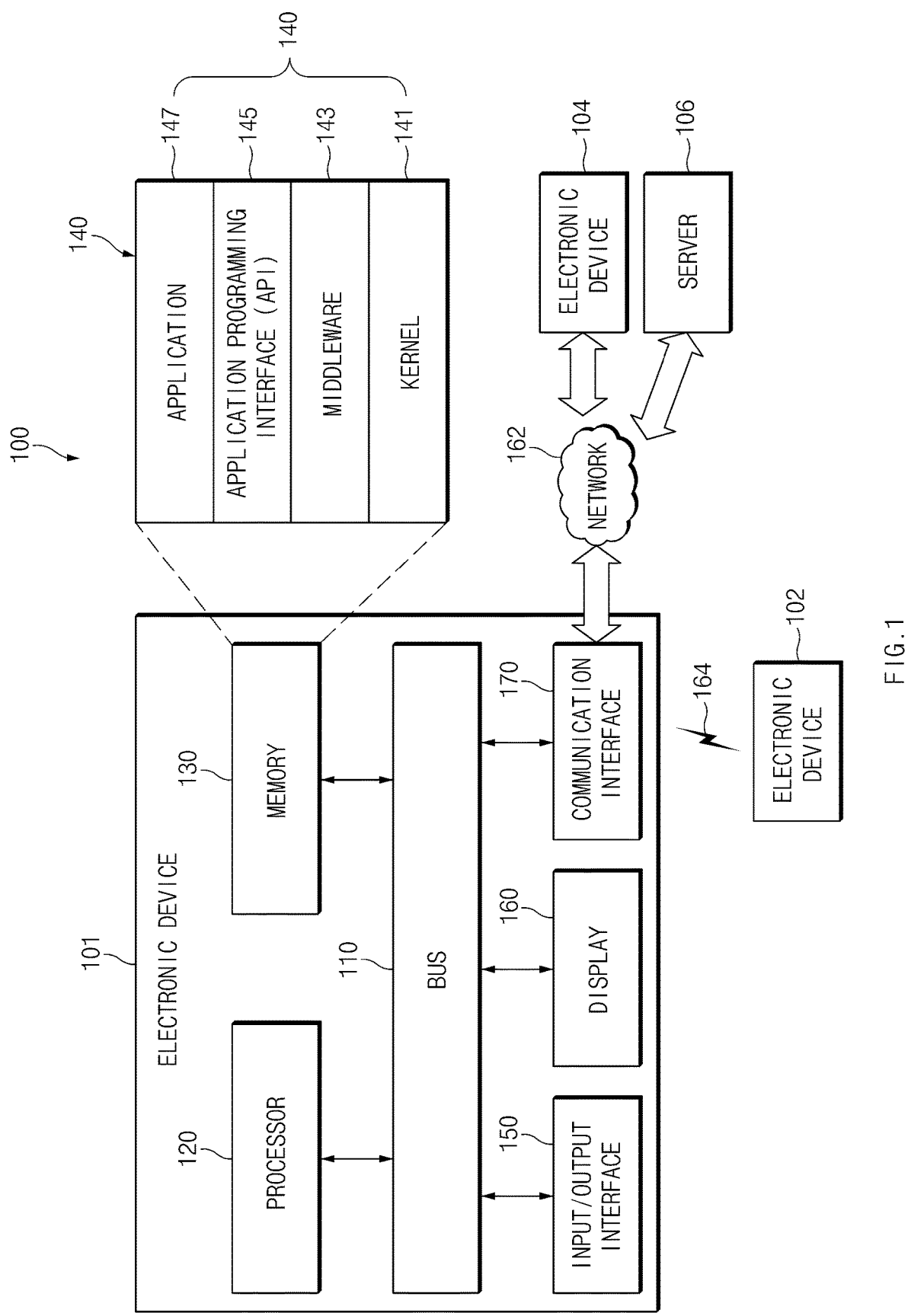
FIG. 1 is a diagram illustrating a network environment system, according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding description of the drawings, like reference numerals may refer to like elements.

The terms "have", "may have", "include", "may include" or "comprise" used herein indicate the existence of a corresponding feature (e.g., a number, a function, an operation, or an element) and do not exclude the existence of an additional feature.

The term "A or B", "at least one of A and/or B", or "one or more of A and/or B" may include all possible combinations of items listed together with the term. For example, the terms "A or B", "at least one of A and B", or "at least one of A or B" may indicate all the cases of (1) including at least one A, (2) including at least one B, and (3) including at least one A and at least one B.

The terms "first", "second" or the like used herein may modify various elements regardless of the order and/or priority thereof, and do not limit the elements. Such terms may be used to distinguish one element from another element. For example, "a first user device" and "a second user device" may indicate different user devices regardless of the order or priority. For example, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is not for limiting the present disclosure but for describing specific various embodiments. The terms of a singular form may include plural forms unless otherwise specified. The terms used herein, including technical or scientific terms, have the same meanings as those understood by those skilled in the art. Commonly-used terms may be interpreted as having meanings that are the same as or similar to contextual meanings defined in the related art, and should not be interpreted in an idealized or overly formal sense unless otherwise defined explicitly. Depending on circumstances, the terms defined herein should not be such interpreted as to exclude various embodiments of the present disclosure.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

An electronic device described herein may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device (e.g., smart-glasses, a head-mounted device (HMD), an electronic apparel, an electronic bracelet, an electronic necklace, an electronic appcessory, an electronic tattoo, a smart mirror, or a smartwatch).

The electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung Home-Sync®, Apple TV®, or Google TV®), a game console (e.g., Xbox® or PlayStation®), an electronic dictionary, an electronic key, a camcorder, or an electronic picture frame.

The electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global positioning system (GPS) receiver, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) devices of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

The electronic device may include at least one of a part of furniture or a building/structure, an electronic board, an electronic signature receiving device, a projector, or a measuring instrument (e.g., a water meter, an electricity meter, a gas meter, a wave meter, or the like). The electronic device may be one or more combinations of the above-mentioned devices. The electronic device may be a flexible device. The electronic device is not limited to the above-mentioned devices, and may include new electronic devices with the development of technology.

Hereinafter, an electronic device will be described with reference to the accompanying drawings. The term "user" used herein may refer to a person who uses an electronic device or may refer to a device (e.g., an artificial intelligence electronic device) that uses an electronic device.

FIG. 1 is a diagram illustrating a network environment system, according to an embodiment of the present disclosure. Referring to FIG. 1, an electronic device 101 is a component in a network environment 100. The electronic device 101 includes a bus 110, a processor 120, a memory 130, an input/output interface 150, a display 160, and a communication interface 170. At least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation for communication and/or control of at least one of the other elements of the electronic device 101.

The memory device 130 may include a volatile memory and/or a nonvolatile memory. The memory 130 may store an instruction or data related to at least one of the other elements of the electronic device 101. The memory 130 may store software and/or a program 140. The program 140 includes, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 so as to control or manage the system resources.

The middleware 143 may serve as an intermediary between the API 145 or the application program 147 and the kernel 141 so that the API 145 or the application program 147 communicates and exchanges data with the kernel 141. Furthermore, the middleware 143 may perform a control operation (e.g., scheduling or load balancing) with respect to operation requests received from the application 147 by using, e.g., a method of assigning a priority for using system resources (e.g., the bus 110, the processor 120, the memory 130, or the like) of the electronic device 101 to at least one application of the application program 147.

The API 145, which is an interface for allowing the application program 147 to control a function provided by the kernel 141 or the middleware 143, may include at least one interface or function (e.g., an instruction) for file control, window control, image processing, character control, or the like.

The input/output interface 150 transfers an instruction or data input from a user or another external device to an element(s) of the electronic device 101. Furthermore, the input/output interface 150 may output an instruction or data received from an element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may show various content (e.g., a text, an image, a video, an icon, a symbol, or the like) to the user. The display 160 may include a touchscreen, and may receive a touch, gesture, proximity or hovering input from an electronic pen or a part of a body of the user.

The communication interface 170 may set communications between the electronic device 101 and an external electronic device 104, or a server 106. For example, the communication interface 170 may be connected to a network 162 wirelessly or by wire so as to communicate with the external electronic device (e.g., the second external electronic device 104 or the server 106).

For example, cellular communication protocols such as long term evolution (LTE), LTE advanced (LTE-A), code division multiple access (CDMA), wideband CDMA (WCDMA), Universal Mobile Telecommunications System (UMTS), wireless broadband (WiBro), Global System for Mobile Communications (GSM), or the like may be used for the wireless communication. A technology for the wired communication may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., a local area network (LAN) or wide area network (WAN)), the Internet, or a telephone network.

The types of the first and second external electronic devices 102 and 104 may be the same as or different from the type of the electronic device 101. The server 106 may include a group of one or more servers.

A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
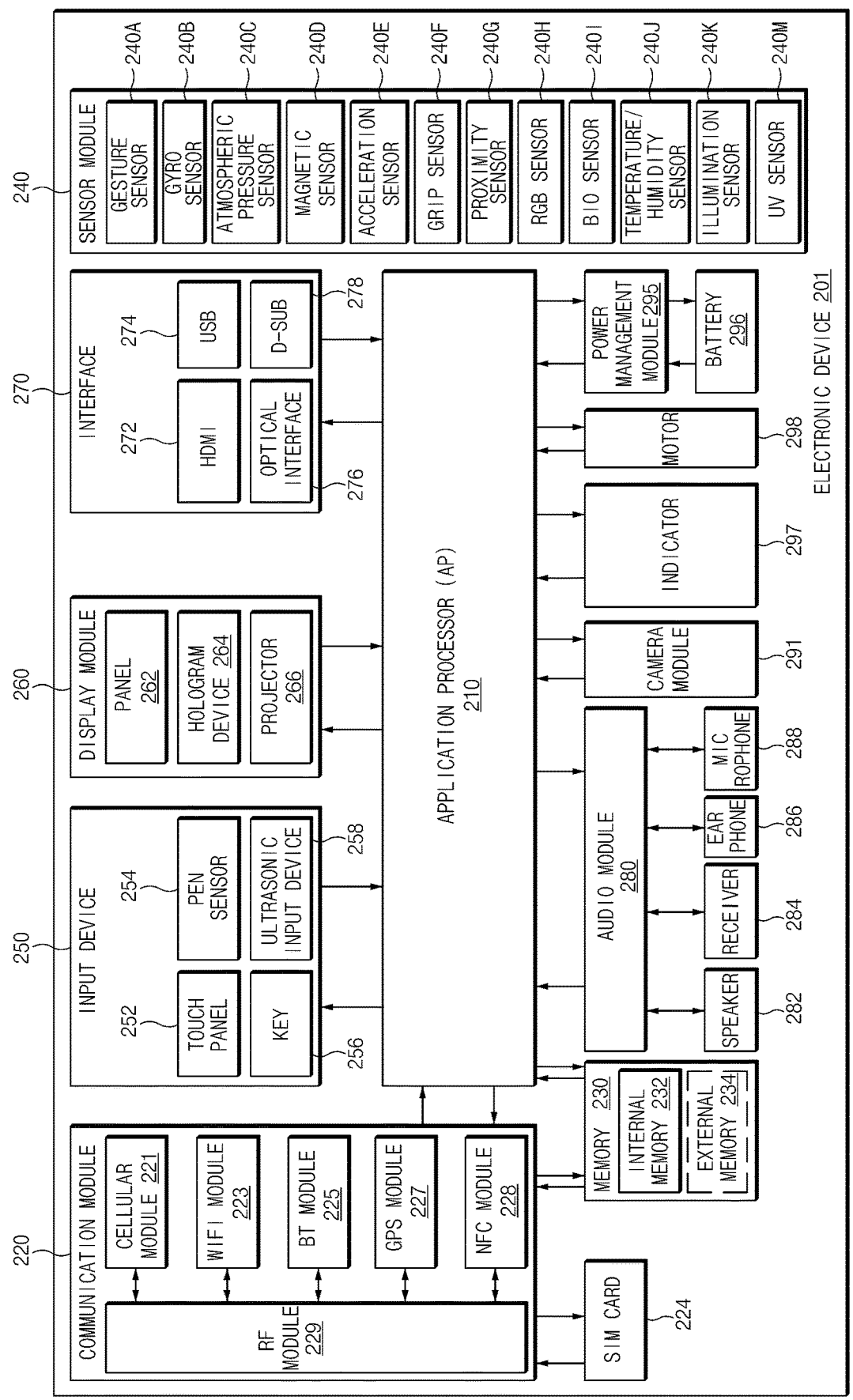
FIG. 2 is a diagram illustrating an electronic device, according to an embodiment of the present disclosure.

FIG. 2 is a diagram illustrating an electronic device 201, according to an embodiment of the present disclosure. The electronic device 201 may include, for example, a part or the entirety of the electronic device 101 illustrated in FIG. 1. The electronic device 201 includes at least one application processor (AP) 210, a communication module 220, a SIM card 224, a memory 230, a sensor module 240, an input device 250, a display 260, an interface 270, an audio module 280, a camera module 291, a power management module 295, a battery 296, an indicator 297, and a motor 298.

The AP 210 may run an operating system or an application program so as to control a plurality of hardware or software elements connected to the AP 210 and may process various data and may perform operations. The AP 210 may be implemented with, for example, a system on chip (SoC). The AP 210 includes a graphic processing unit (GPU) and/or an image signal processor. The AP 210 may include at least a portion (e.g., the cellular module 221) of the elements illustrated in FIG. 2. The AP 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 160 of FIG. 1. The communication module 220 includes, for example, a cellular module 221, a Wi-Fi module 223, a BT module 225, a GPS module 227, an NFC module 228, and a radio frequency (RF) module 229.

The cellular module 221 may provide, for example, a voice call service, a video call service, a text message service, or an Internet service through a communication network. The cellular module 221 may identify and authenticate the electronic device 201 in the communication network using the SIM card 224. The cellular module 221 may perform at least a portion of functions provided by the AP 210. The cellular module 221 may include a communication processor (CP).

Each of the Wi-Fi module 223, the BT module 225, the GPS module 227, and the NFC module 228 may include, for example, a processor for processing data transmitted/received through the modules. At least a portion (e.g., at least two) of the cellular module 221, the Wi-Fi module 223, the BT module 225, the GPS module 227, and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. At least one of the cellular module 221, the Wi-Fi module 223, the BT module 225, the GPS module 227, or the NFC module 228 may transmit/receive RF signals through a separate RF module.

The SIM card 224 may include, for example, an embedded SIM and/or a card including a user identification module, and may include unique identification information (e.g., an integrated circuit card identifier (ICCID)) or subscriber information (e.g., international mobile subscriber identity (IMSI)).

The memory 230 includes an internal memory 232 or an external memory 234. The internal memory 232 may include at least one of a volatile memory (e.g., a dynamic read access memory (RAM) (DRAM), a static RAM (SRAM), a synchronous dynamic RAM (SDRAM), or the like) or a nonvolatile memory (e.g., a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 234 may include a flash drive, for example, compact flash (CF), secure digital (SD), micro secure digital (Micro-SD), mini secure digital (Mini-SD), extreme digital (xD), a memory stick, or the like. The external memory 234 may be operatively and/or physically connected to the electronic device 201 through various interfaces.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. The electronic device 201 may further include a processor configured to control the sensor module 240 as a part of the AP 210 or separately, so that the sensor module 240 is controlled while the AP 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide tactile reaction to a user.

The (digital) pen sensor 254 may include, for example, a sheet for recognition which is a part of or separate from a touch panel. The key 256 may include, for example, a physical button, an optical key, or a keypad. The ultrasonic input device 258, which employs an input tool for generating an ultrasonic signal, may enable the electronic device 201 to sense a sound wave through a microphone 288 so as to identify data.

The display 260 may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. The display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature 278. The interface 270 may be included in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) interface.

The audio module 280 may convert, for example, a sound into an electrical signal or vice versa. At least a portion of elements of the audio module 280 may be included in the input/output interface 140 illustrated in FIG. 1. The audio module 280 may process sound information input or output through a speaker 282, a receiver 284, an earphone 286, or the microphone 288.

The camera module 291 is configured to shoot a still image or a video and may include, for example, at least one image sensor (e.g., a front sensor or a rear sensor), a lens, an image signal processor (ISP), or a flash (e.g., an LED or a xenon lamp).

The power management module 295 may manage, for example, power of the electronic device 201. The power management module 295 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the AP 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), or MediaFLO®.

Each of the above-mentioned elements of the electronic device 201 may be configured with one or more components, and the names of the elements may be changed according to a type of the electronic device 201. The electronic device 201 may include at least one of the above-mentioned elements, and some elements may be omitted or other additional elements may be added. Furthermore, some of the elements of the electronic device 201 may be combined with each other so as to form one entity, so that the functions of the elements may be performed in the same manner as before the combination.

Figure 3:
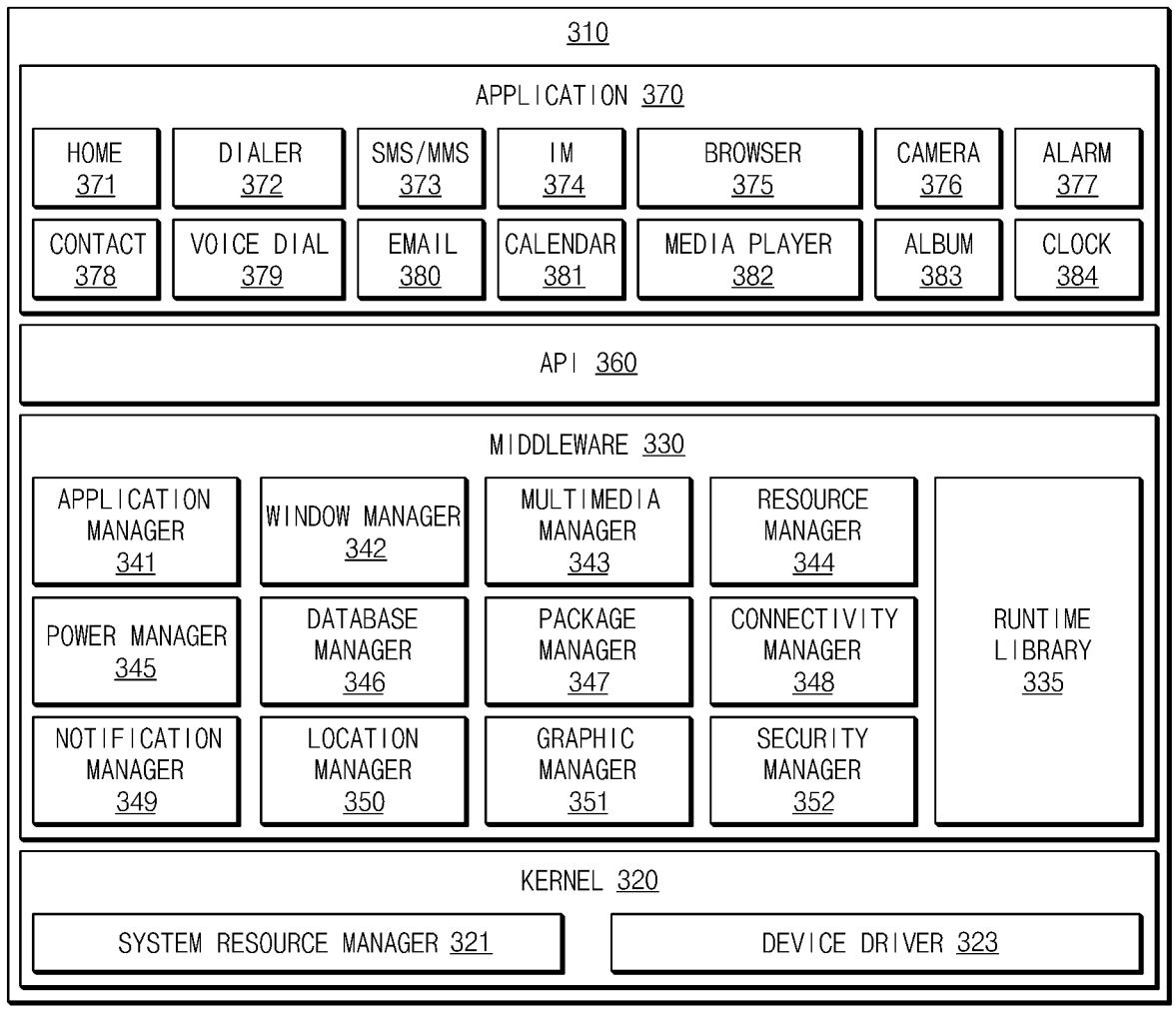
FIG. 3 is a diagram illustrating a programming module, according to an embodiment of the present disclosure.

FIG. 3 is a diagram of a program module 310, according to an embodiment of the present disclosure. The program module 310 may include an operating system (OS) for controlling a resource related to an electronic device (e.g., the electronic device 101/201, hereinafter simply referred to as the electronic device) and/or various applications running on the operating system. The operating system may be, for example, Android®, iOS®, Windows®, Symbian®, Tizen®, Bade, or the like.

The program module 310 includes a kernel 320, a middleware 330, an application programming interface (API) 360, and/or an application program 370. At least a part of the program module 310 may be preloaded on the electronic device or may be downloaded from a server (e.g., the server 106).

The kernel 320 includes, for example, a system resource manager 321 or a device driver 323. The system resource manager 321 may perform control, allocation, or retrieval of a system resource. The system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the application 370 requires, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manager 348 may manage wireless connection of Wi-Fi, Bluetooth, or the like. The notification manager 349 may display (or notify of) an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. In the case where the electronic device includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 which is, for example, a set of API programming functions may be provided in different configurations according to an operating system. For example, in the case of Android® or iOS®, one API set may be provided for each platform, and, in the case of Tizen®, at least two API sets may be provided for each platform.

The application 370 may include, for example, at least one application for providing functions, such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information provision (e.g., provide air pressure, humidity, or temperature information).

The application 370 may include an application for supporting information exchange (hereinafter "information exchange application") between the electronic device and an external electronic device 102 or 104. The information exchange application may include, for example, a notification relay application for relaying specific information to the external electronic device or a device management application for managing the external electronic device.

For example, the notification relay application may have a function for relaying, to an external electronic device 102 or 104, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user. The device management application, for example, may manage (e.g., install, delete, or update) at least one function (e.g., turn-on/turn off of the external electronic device itself (or some elements) or the brightness (or resolution) adjustment of a display) of the external electronic device communicating with the electronic device, an application operating in the external electronic device, or a service (e.g., call service or message service) provided from the external electronic device.

The application 370 may include a specified application (e.g., a health care application) according to an attribute (e.g., the type of an electronic device, for example a mobile medical device) of the external electronic device. The application 370 may include an application received from an external electronic device. The application 370 may include a preloaded application or a third-party application downloadable from a server. The names of elements illustrated in the program module 310 may vary with the type of an operating system.

At least a part of the program module 310 may be implemented with software, firmware, hardware, or a combination thereof. At least a part of the programming module 310, for example, may be implemented (e.g., executed) by a processor (e.g., the AP 210). At least a part of the programming module 310 may include, for example, a module, a program, a routine, sets of instructions, or a process for performing at least one function.

Figure 4:
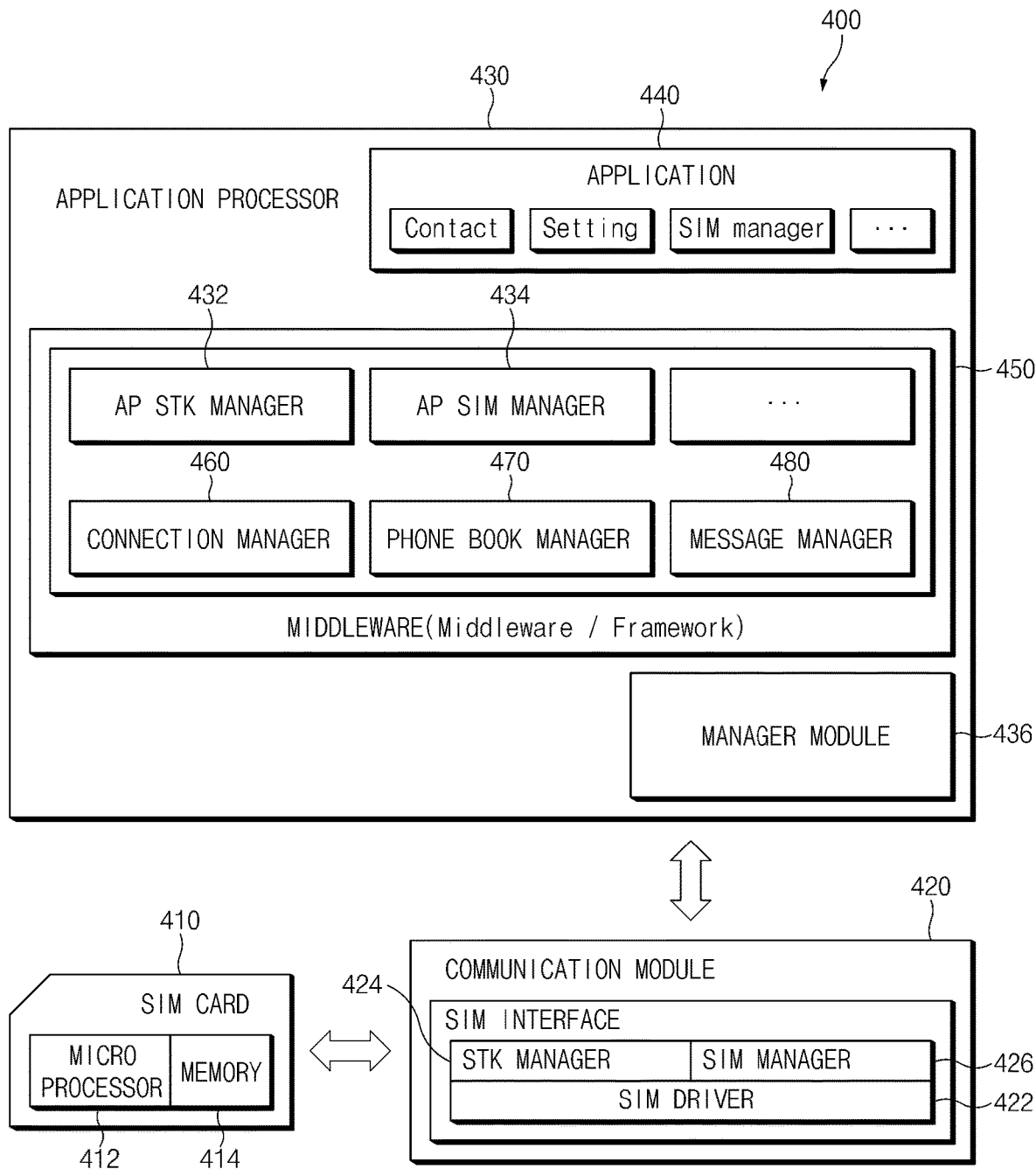
FIG. 4 is a diagram illustrating communication function-related modules of an electronic device, according to an embodiment of the present disclosure.

FIG. 4 is a diagram illustrating communication function-related modules of an electronic device 400, according to an embodiment of the present disclosure. Referring to FIG. 4, the electronic device 400 includes modules for supporting a communication function, for example, a SIM card 410, a communication module 420, and an application processor (AP) 430. The SIM card 410 may include, for example, the SIM card 224 of FIG. 2, and may be referred to as, for example, a universal integrated circuit card (UICC) having a meaning that is the same as or similar to that of a conventional SIM card. The communication module 420 may include the communication interface 170 of FIG. 1 and/or the communication module 220 of FIG. 2. The application processor 430 may include, for example, the processor 120 of FIG. 1 and/or the AP 210 of FIG. 2.

The SIM card 410 includes a microprocessor 412 and a memory 414. The memory 414 of the SIM card 410 may store subscriber information (e.g., user's phone number, password, charging information, or the like) and network registration information loaded in relation to a mobile communication network for a network service to be used by a user of the electronic device 400. The subscriber information (e.g., IMSI) of the SIM card 410 may include a mobile country code (MCC), a mobile network code (MNC), or a mobile directory number (MDN). Furthermore, the SIM card 410 may include information (e.g., a service provider name (SPN)) for distinguishing or identifying each communications service provider among a plurality of communications service providers (e.g., mobile network operators (MNOs)).

The SIM card 410 may be a smart card installed in the electronic device 400 to provide various information required for using a specific network/mobile communications system by the electronic device 400. The SIM card 410 may be, for example, a subscriber identity module (SIM) card of a GSM system, a universal subscriber identity module (USIM) card of a universal mobile telecommunications system (UMTS), or a user identity module (UIM) card or removable user identity module (RUIM) card of a CDMA system.

Unlike a removable card, the SIM card 410 may be mounted as a chip in the electronic device 400 during a manufacturing process of the electronic device 400, so that the user that has purchased the electronic device 400 may be unable to remove the SIM card 410. For example, the SIM card 410 may be an embedded universal integrated circuit card (eUICC) or an embedded subscriber identity module (eSIM). The SIM card 410 may be configured so that information (e.g., provider information) stored therein is able to be modified through a specific communication standard (e.g., over-the-air (OTA)) without removing the SIM card 410. The SIM card 410 may be an integrated circuit (IC) card, a hybrid card, or a combi card, e.g., a dual interface card.

Various pieces of information may be bundled in one or more software units so as to be stored in the SIM card 410. For example, information (e.g., information related to an application, data, or a file structure) related to a specific subscriber for a network/communications system operated by a specific communications service provider may be packaged in one software unit corresponding to the specific communications service provider and the specific subscriber. This software unit may be referred to as a "profile" below.

The SIM card 410 (e.g., eUICC) may be sold to a user without containing provider information. The SIM card 410 may be configured so as to allow the user to access a provider's network to be used by the user and download a subscriber profile corresponding to the SIM card 410 so that the electronic device 400 may use a network service provided by the provider through the SIM card 410. The subscriber profile may include communications service provider information corresponding to a specific MNO, roaming information, authentication information (e.g., IMSI or the like), subscriber information (ICCID or the like), or the like. The electronic device 400 may contain (e.g., install) the subscriber profile therein, and may access a network of a specific MNO using the subscriber profile. Accordingly, the user may receive a network service provided by the specific MNO. The subscriber profile may include a provider (MNO) profile, an operator profile, a UICC profile, or the like. Hereinafter the subscriber profile may be referred to as a provider profile having a meaning that is the same as or similar to that of the subscriber profile.

The SIM card 410 may store various information related to a plurality of providers. For example, a plurality of subscriber profiles corresponding to the plurality of providers respectively may be downloaded onto the card 410. The user may access a plurality of networks based on the plurality of subscriber profiles. The user may simultaneously or sequentially use a plurality of network services related to the plurality of providers using the communication module 420. Furthermore, the user may select a specific MNO from among the plurality of providers.

The communication module 420 includes, for example, a SIM driver 422, a subscriber identity module tool kit (STK) manager 424, or a SIM manager 426.

The SIM driver 422, which is a module for providing an interface for enabling interworking between the electronic device 400 and the SIM card 410, may serve as a passage for transferring data between the SIM card 410 and the electronic device 400 or other elements of the electronic device 400 (e.g., the memory 230, the sensor module 240, the input device 250, the display 260, the interface 270, the audio module 280, or the camera module 291 of FIG. 2) and may manage a hardware driver of the SIM card 410. The SIM driver 422 may be referred to as a subscriber identification module interface for accessing the provider profile contained (e.g., installed) in the SIM card 410.

The STK manager 424 may provide an interface for enabling interworking between a provider application and the electronic device 400 or other elements of the electronic device 400 (e.g., the memory 230, the sensor module 240, the input device 250, the display 260, the interface 270, the audio module 280, or the camera module 291 of FIG. 2). For example, the STK manager 424 may enable interworking between the electronic device 400 and third-party applications (e.g., a mobile transportation card, a mobile wallet, or the like) or provider applications stored in the SIM card 410. The user of the electronic device 400 may receive providers' network services corresponding to the provider applications or may use data received from the provider applications through the STK manager 424.

The SIM manager 426 may provide a communication interface for allowing the user of the electronic device 400 to manage data related to the provider profile in the SIM card 410. For example, the SIM manager 426 may provide a communication interface for changing the data related to the provider profile in the SIM card 410 or using the provider profile by using the SIM driver 422.

The application processor 430 may execute an application 440, a middleware 450, or a manager module 436, wherein the middleware 450 may include an AP STK manager 432 and/or an AP SIM manager 434.

The AP STK manager 432 may provide an interface for enabling interworking between the STK manager 424 and the application 440 of the electronic device 400. For example, the AT STK manager 432 may transfer data related to the application 440 to the STK manager 424 of the communication module 420, or may transfer data received from the STK manager 424 to the application 440.

The AP SIM manager 434 may provide an interface for enabling interworking between the application 440 of the electronic device 400 or another module included in the middleware 450 (e.g., a connection manager 460, a phone book manager 470, or a message manager 480) and the SIM manager 426. For example, the AP SIM manager 434 may transfer information related to the application 440 or another module included in the middleware 450 (e.g., the connection manager 460, the phone book manager 470, or the message manager 480) to the SIM manager 426 of the communication module 420, or may transfer information received from the SIM manager 426 to the application 440 or another module included in the middleware 450 (e.g., the connection manager 460, the phone book manager 470, or the message manager 480). The AP SIM manager 434 may request the SIM manager 426 to read or write information of the SIM card 410, or may instruct the SIM manager 426 to synchronize a status of the provider profile included in the SIM card 410 through the SIM manager 426, in response to an external input (e.g., a user input). According to the status of the provider profile, a provider of a network service provided to the user may be changed, and a user interface of the electronic device 400 or information provided through the user interface may be changed. The status of the provider profile will be described below with reference to FIG. 7.

The manager module 436 may manage a user interface displayed on the electronic device 400 in relation to the provider profile of the SIM card 410. Furthermore, the manager module 436 may change a status of information (e.g., generation, modification, deletion, or movement of information) for managing the user interface. For example, the manager module 436 may manage the user interface displayed on the electronic device 400 using the provider profile information stored in the SIM card 410. Furthermore, the manager module 436 may change the user interface dynamically (e.g., in real time) according to the provider profile information changed based on a user input.

The manager module 436 may transmit or receive a portion of the information for managing the user interface to or from one or more external devices 102 or 104 or the server 106. For example, the manager module 436 may use a network (e.g., the network 162) between the electronic device 400 and the external device, and may transmit a part or the entirety of the information for managing the user interface via the network, by using the communication module 420. In relation to the transmission, the user interface displayed on the electronic device 400 may be dynamically changed, and a user interface of the external device that has received the part or the entirety of the information for managing the user interface may also be changed. Also in the case of receiving the part or the entirety of the information for managing the user interface from the external device, the user interface of each of the electronic device 400 and the external device may be changed.

The manager module 436 may manage information exchanged between the communication module 420 and the application processor 430. For example, information received from the STK manager 424 may be used or changed by the manager module 436. Furthermore, the manager module 436 may transmit the information received from the STK manager 424 to the application 440 or the middleware 450. Likewise, information received from the application 440 or the middleware 450 may be used or changed by the manager module 436. Furthermore, the manager module 436 may transmit the information received from the application 440 or the middleware 450 to the STK manager 424. Information received from the SIM manager 426 may be used or changed by the manager module 436. Furthermore, the manager module 436 may transmit the information received from the SIM manager 426 to the application 440 or the middleware 450. Likewise, information received from the application 440 or the middleware 450 may be used or changed by the manager module 436. Furthermore, the manager module 436 may transmit the information received from the application 440 or the middleware 450 to the SIM manager 426.

The manager module 436 may be implemented as at least a part of other elements of the electronic device 400 (e.g., the application processor 430, the AP SIM manager 434, the communication module 420, or the SIM manager 426), or may be implemented as at least a part of the external device 102 or 104 or the server 106 of FIG. 1. For example, the manager module 436 may be implemented as an individual module that may be executed by the application processor 430, or may be included in the AP SIM manager 434. Alternatively, the manager module 436 may be implemented as an individual sub module in the communication module 420, or may be included in the SIM manager 426. The manager module 436 may be present in one or more external devices 102 or 104 or the server 106 of FIG. 1, and may exchange data with the electronic device 400 via the communication module 420. The manager module 436 may manage the user interface displayed on the electronic device 400 based on the data exchanged.

The manager module 436 may manage information (e.g., a device management attribute 800) generated based on the provider profile information stored in the SIM card 410. The information generated based on the provider profile information may include a device management attribute that may include a priority order, a schedule, configuration information, a mode, security, a user interface configuration, an application list, a communication log, contact information, or the like used or generated in the electronic device 400. The manager module 436 may generate, delete, change, hide or move a part or the entirety of the device management attribute. For example, the manager module 436 may generate, delete, change, hide or move at least a part of information (e.g., a priority order, a schedule, configuration information, a mode, security, a user interface configuration, an application list, a communication log, contact information, or the like) included in the device management attribute based on an external input (e.g., a user input). The manager module 436 may display a user interface based on the generated, deleted, changed, hidden or moved information of the device management attribute.

Furthermore, the manager module 436 may be operatively connected to a memory (e.g., the memory 230), in which the device management attribute is stored, to manage the device management attribute. For example, the manager module 436 may manage the use of the device management attribute by controlling access to the memory in which the device management attribute is stored.

Figure 5:
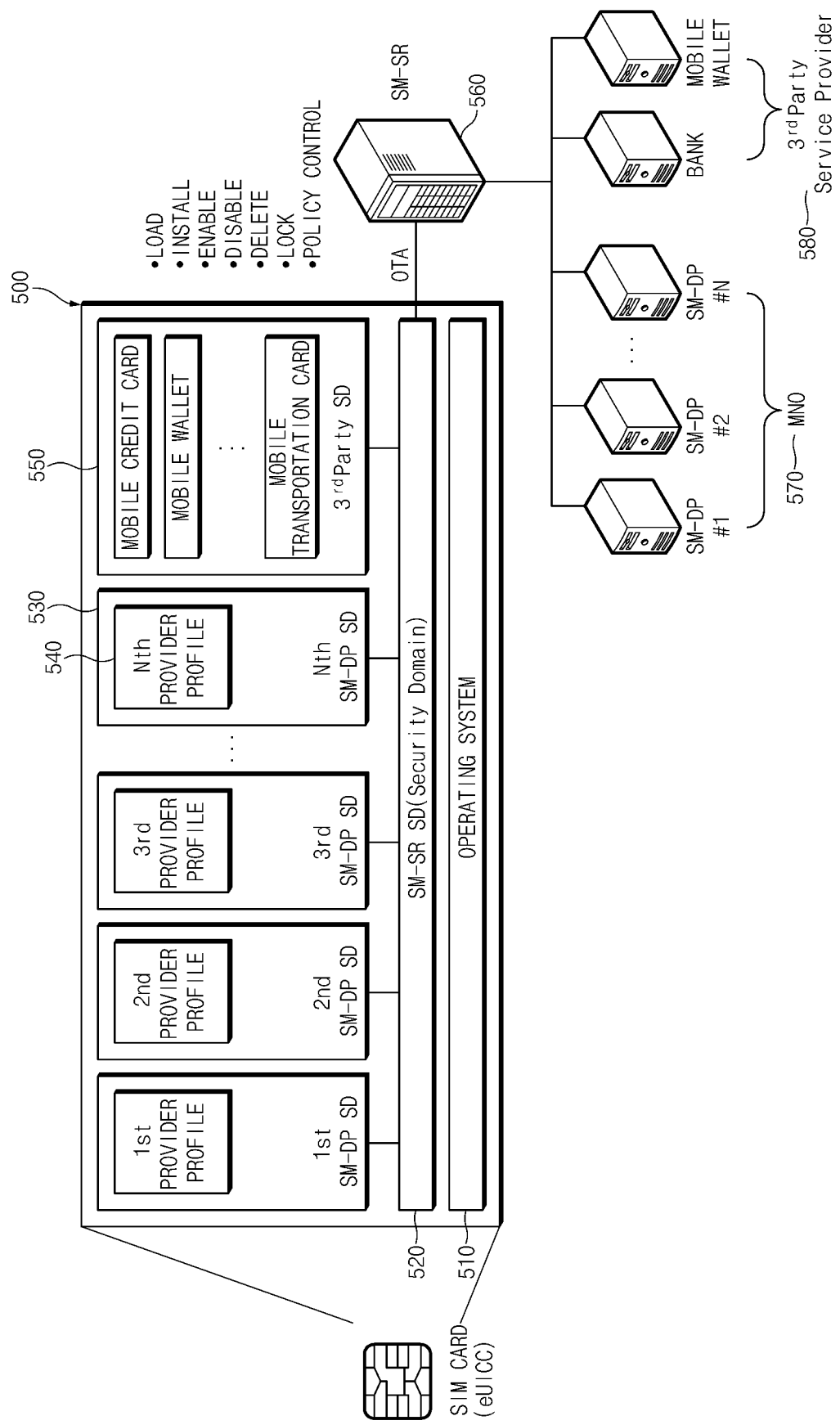
FIG. 5 is a diagram illustrating a process of data transfer between an electronic device and an external device, according to an embodiment of the present disclosure.

FIG. 5 is a diagram illustrating a process of data transfer between an electronic device and an external device, according to an embodiment of the present disclosure. The electronic device (e.g., the electronic device 400) may manage a plurality of provider profiles stored in a SIM card 500 or provider profiles provided from an external device. Referring to FIG. 5, the SIM card 500 includes, for example, an operating system 510, a subscription manager—secure routing security domain (SM-SR SD) 520, a subscription manager—data preparation security domain (SM-DP SD) 530, a provider profile 540, or a third-party security domain (SD) 550. The SIM card 500 may communicate with a subscription manager—secure routing (SM-SR) 560, an MNO 570, or a third-party service provider 580. The provider profile may be at least a part of a SIM corresponding to the MNO 570.

The operating system 510 may provide a platform for operating the SIM card 500. For example, the SIM card 500 may communicate with one or more external devices 102 or 104 or the server 106 or may exchange information with various modules (e.g., the communication module 420 or the application processor 430) included in the electronic device 400 based on the operating system 510.

The SM-SR SD 520 may directly manage the SIM card 500. The SM-SR SD 520 may change a status of the provider profile 530 stored in the SIM card 500. The SM-SR SD 520 may delete, enable, or disable the provider profile 530 or may generate the provider profile 530 (by downloading it from an external device 102 or 104 or the server 106).

The SM-DP SD 530 may manage a provider profile installed or generated in the SIM card 500. The SM-DP SD 530 may receive the provider profile from the outside to install the provider profile in the SIM card 500. Furthermore, the SM-DP SD 530 may perform encoding or decoding of the provider profile. For example, the SM-DP SD 530 may decode an encoded provider profile received from an external device so that an electronic device 400 operatively connected to the SIM card 500 may use the provider profile.

The provider profile 540 may be provided by the MNO 570, and a plurality of the provider profiles 540 provided by the same MNO 570 may be stored in one SIM card 500. For example, first and second provider profiles provided by a first MNO and/or a third provider profile provided by a second MNO may be stored in one SIM card 500.

The third-party SD 550 may manage various services (e.g., a mobile credit card, a mobile wallet, a mobile transportation card, or the like) provided by the third-party service provider 580. For example, in a manner similar to that of managing the provider profile 540 by the SM-DP SD 530, the third-party SD 550 may manage service information (e.g., mobile credit card information, mobile wallet information, mobile transportation card information, or the like) received from the third-party service provider 580.

The SM-SR 560 may transfer a provider profile to the SIM card 500 using a specific communication standard (e.g., OTA), or may change a status (e.g., load, install, enable, disable, delete, or lock) of the provider profile or the third-party service (e.g., a mobile credit card, a mobile wallet, a mobile transportation card, or the like), or may manage a policy of the third-party service or the provider profile. For example, the SM-SR 560 may transfer the provider profile of the SM-SR 560 to the SIM card 500 so that the provider profile may be installed in the SIM card 500, or may change the status of the provider profile installed in the SIM card 500 based on the status of the provider profile of the SM-SR 560.

The MNO 570 may interwork with the SM-SR 560 so as to provide information related to the provider profile installed in the SIM card 500. For example, the MNO 570 may provide information related to the SM-DP SD 530, and data included in the provider profile 540 may be received from the MNO 570. The MNO 570 may be a plurality of MNOs, and may provide different pieces of information corresponding to the MNOs respectively to the SIM card 500. Furthermore, the MNO 570 may encode the provider profile to be provided to the SIM card 500 and may transmit the encoded provider profile to the SIM card 500 in order to protect the provider profile, and the SM-DP SD 520 may decode the encoded provider profile. The MNO 570 may include a plurality of SM-DPs.

The third-party service provider 580 may interwork with the third-party SD 550 so as to provide information to be installed in the SIM card 500. For example, the third-party service provider 580 may provide information related to the third-party SD 550 to the third-party SD 550, and data included in the third-party SD 550 may be received from the third-party service provider 580. The third-party service provider 580 may be a plurality of third-party service providers, and different pieces of information corresponding to the plurality of third-party service providers 580 may be provided to the SIM card 500. A user may use various services (e.g., a banking service, a wallet service, or the like) using service information (e.g., mobile credit card information, mobile wallet information, mobile transportation card information, or the like) used in the third-party SD 550 from the third-party service provider 580.

Figure 6:
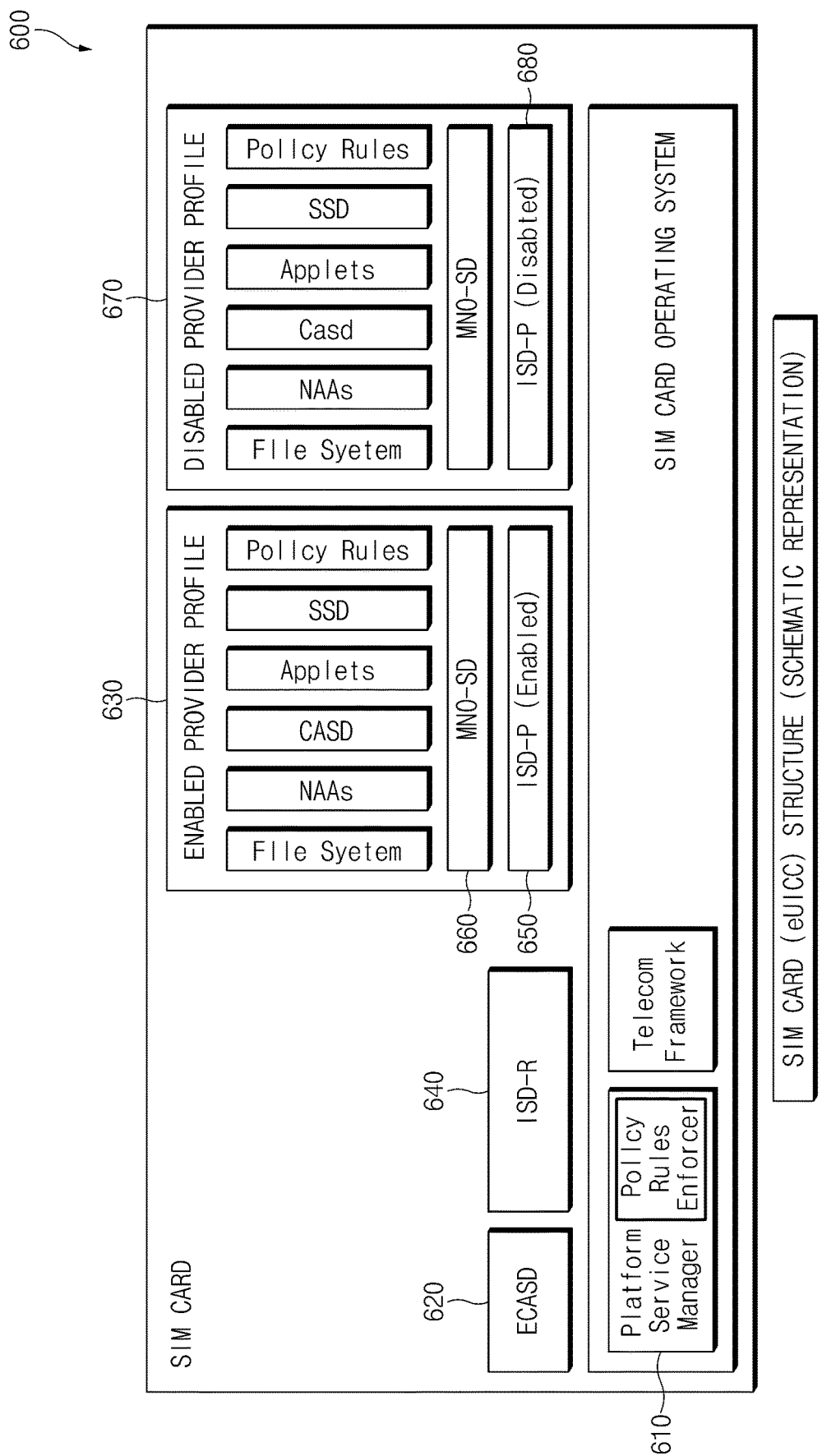
FIG. 6 is a diagram illustrating a structure of a SIM card of an electronic device according to various embodiments of the present disclosure.

FIG. 6 is a diagram illustrating a structure of the SIM card 600 of an electronic device, according to an embodiment of the present disclosure. Referring to FIG. 6, a SIM card 600 includes, for example, a SIM card operating system 610, an eUICC certificate authority security domain (ECASD) 620, provider profiles 630 and 670, an issuer security domain-root (ISD-R) 640, an issuer security domain-profile (ISD-P) 650, or a mobile network operator-security domain (MNO-SD) 660.

The SIM card operating system 610 may include the operating system 510 of FIG. 5. Alternatively, the SIM card operating system 610 may include a platform service manager for providing a policy control mechanism and a function of managing a platform for operating the SIM card 600 or a telecom framework for providing a network authentication algorithm. For example, the SIM card operating system 610 may extract, from the provider profile 630, information (e.g., a profile ID or a profile status) related to the ISD-P 650, and may provide a standardized network authentication algorithm of network access applications (NAAs) included in the provider profile 630.

The ECASD 620 is installed during a manufacturing process of the SIM card 600, and may not be removed or disabled. The ECASD 620 may provide authentication-related information. The ECASD 620 may include, for example, an unchangeable private key of the SIM card 600, a certificate, a root public key of a certificate issuer, or a manufacturer keyset of the SIM card 600 for updating a key value and a certificate. The ECASD 620 may be associated with the ISD-R 640 that provides a secure channel for specific communication (e.g., over the air (OTA)).

The provider profiles 630 and 670 may include the provider profile stored in the SIM card 410 of FIG. 4 or the provider profile 540 of FIG. 5. Furthermore, each of the provider profiles 630 and 670 may include a SIM corresponding to an MNO (e.g., the MNO 570). The provider profile 630 may include the ISD-P 650 and/or the MNO-SD 660. For example, the provider profile 630 may be associated with the ISD-R 640 using the IDS-P 650.

The ISD-R 640 is installed during a manufacturing process of the SIM card 600, and may be associated with the SM-SR 560 of FIG. 5 in the SIM card 600 so as to perform platform management. The platform may include the SIM card operating system 610. For example, the ISD-R 640 may not be removed or may not be disabled. Furthermore, a secure communication channel (e.g., OTA channel) may be established between the ISD-R 640 and an external entity (e.g., the SM-SR 560 of FIG. 5), and a new ISD-P 650 may be generated according to an amount of memory allocation of an electronic device 400 operatively connected to the SIM card 600.

The ISD-P 650 may be an individual and separate entity in the SIM card 600, and may be included in the provider profile 630. For example, the ISD-P 650 may manage a status (e.g., generate, enable, or disable) of the provider profile 630. Furthermore, the ISD-P 650 may include a key for loading or installing the provider profile 630. Moreover, the ISD-P 650 may implement a key establishment protocol for generating the keyset among pieces of authentication-related information included in the ECASD 620. The ISD-P 650 may perform a personalized individual function/operation related to the provider profile 630 using the keyset. The ISD-P 650 may receive a profile (e.g., a provider profile) generated by at least one of a plurality of SM-DPs included in an MNO (e.g., the MNO 570), and may decrypt, load, or install the received profile. If the profile is installed in the ISD-P 650, the status of the provider profile 630 related to the ISD-P 650 may be managed (e.g., changed) according to the status (e.g., enablement or disablement) of the ISD-P 650. Furthermore, like the provider profile 630, the provider profile 670 may include an ISD-P 680. In relation to the provider profile 670, the ISD-P 680 may perform a function/operation that is the same as or similar to that of the ISD-P 650.

The MNO-SD 660 may include a provider encryption key (e.g., an OTA key). For example, a secure communication channel (e.g., an OTA channel) may be established between the MNO-SD 660 and the ISD-R 640.

One SIM card 600 may store the plurality of ISD-Ps 650 and 680, and each of the plurality of ISD-Ps 650 and 680 may store one provider profile 630 or 670. The provider profiles 630 and 670 in the SIM card 600 may be changed in status according to the statuses (e.g., enablement or disablement) of the ISD-Ps 650 and 680 associated with the provider profiles 630 and 670 respectively. For example, unlike the enabled provider profile 630, the disabled provider profile 670 may be hidden from an electronic device (e.g., the electronic device 400), or a user interface related to the disabled provider profile 670 may not be displayed.

Figure 7:
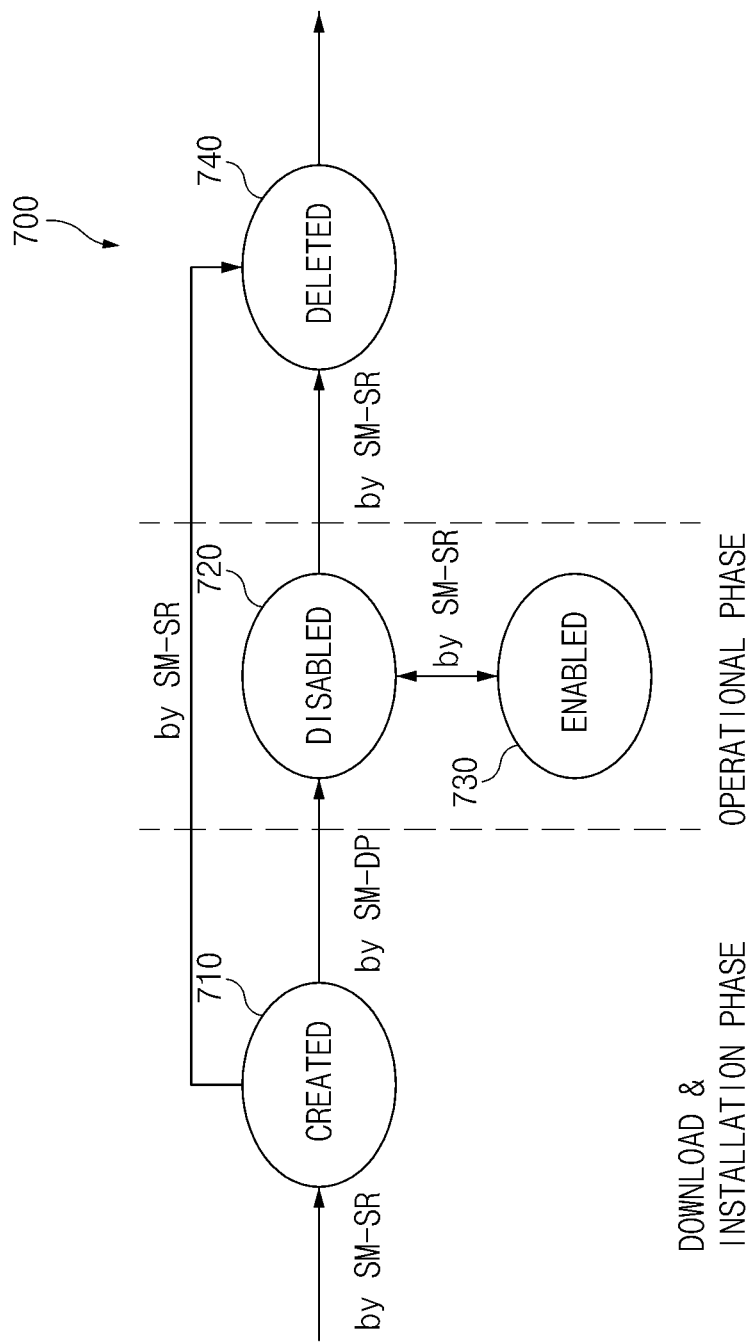
FIG. 7 is a state transition diagram of a SIM card of an electronic device, according to an embodiment of the present disclosure.

FIG. 7 is a state transition diagram of a SIM card of an electronic device, according to an embodiment of the present disclosure. Referring to FIG. 7, a state 700 of a SIM card (e.g., the SIM card 400) may be, for example, a created state 710, a disabled state 720, an enabled state 730, or a deleted state 740. The state 700 of the SIM card may be determined to be the same as that of a specific module (e.g., the ISD-P 650) of the SIM card.

In relation to the created state 710, an ISD-P (e.g., the ISD-P 650) may be generated by an ISD-R (e.g., the ISD-R 640). For example, if the ISD-R generates the ISD-P and sets a key using authentication information (e.g., the information included in the ECASD 620 of FIG. 6), the state of the ISD-P 650 may be the created state 710. Accordingly, the state 700 of the SIM card may be determined to be the created state 710. A command for changing the state 700 of the SIM card into the created state 710 may be received by the SIM card from an SM-SR (e.g., the SM-SR 560) via a secure channel (e.g., an OTA channel). The ISD-R 640 may generate the ISD-P 650 based on information included in the command received. An MNO (e.g., a SM-DP) may generate the MNO-SD 660, NAAs, applets, or file system of FIG. 6, and may store the MNO-SD 660, NAAs, applets, or file system in the ISD-P 650.

In relation to the disabled state 720, the state 700 of the SIM card may be changed from the created state 710 to the disabled state 720 by an MNO (e.g., an SM-DP). For example, the state 700 of the SIM card may be set (e.g., changed) from the created state 710 to the disabled state 720 through a download and installation phase in the SIM card. The ISD-R 640 may notify the SM-SR 560 of the change of the state of the SIM card into the disabled state 720 in order to manage a platform. The SM-SR notified of the change of the state of the SIM card into the disabled state 720 may update state information of the SIM card (e.g., state information of the ISD-P) stored in the SM-SR.

In relation to the enabled state 730, the state 700 of the SIM card may be changed from the disabled state 720 to the enabled state 730 by the SM-SR 560. For example, the state 700 of the SIM card may be changed by the SM-SR into the enabled state 730 in which a service (e.g., a call service, a roaming service, a wallet service, or the like) related to the MNO (e.g., the SM-DP) may be received. The enabled state 730 and the disabled state 720 may be included in an operational phase of the state 700 of the SIM card, and may be changed into each other. For example, the state 700 of the SIM card may be changed from the disabled state 720 into the enabled state 730, and vice versa.

In relation to the deleted state 740, the state 700 of the SIM card may be changed from the disabled state 720 to the deleted state 740 by the SM-SR 560. In the case where the state 700 of the SIM card is changed into the deleted state 740, the SM-SR may delete the ISD-P 650 generated in the SIM card and/or the MNO-SD 660, NAAs, applets, or file system of FIG. 6 generated together with the ISD-P.

The state 700 of the SIM card may be changed based on a user input (e.g., a touch, a double touch, a long press, a touch and swipe leftwards/rightwards, a gesture, or drag-and-drop). For example, in response to the user input, the electronic device 400 may instruct the SM-SR 560 to change the state 700 of the SIM card. Accordingly, the SM-SR may change the state 700 of the SIM card.

The state of a provider profile (e.g., the provider profile 630 or 670) associated with the state 700 of the SIM card may be changed according to the state (e.g., the created state 710, the disabled state 720, the enabled state 730, or the deleted state 740) of the SIM card, and information displayed on the electronic device may be changed according to the state 700 of the SIM card. In the created state 710, the disabled state 720, or the deleted state 740 of the SIM card, the electronic device may not display information related to the provider profile or a user interface associated with the provider profile.

The state of the provider profile (e.g., the provider profile 630 or 670) associated with the state 700 of the SIM card may be changed according to a local status independent of or associated with the state 700 of the SIM card. For example, in the case where the state 700 of the SIM card is the enabled state 730, the electronic device 400 may make the provider profile appear to be in the disabled state 720. Accordingly, although the state 700 of the SIM card is the enabled state 730, the information related to the provider profile may not be shown in the electronic device. In the case where a user changes the state (e.g., enable state or disable state) of a specific provider profile through a user input (e.g., a touch, a double touch, a long press, a touch and swipe leftwards/rightwards, a gesture, or drag-and-drop), the electronic device may maintain the enabled state 730 of the SIM card, and the local status may be set by a specific module (e.g., the SIM driver 422, the SIM manager 426, or the AP SIM manager 434) included in the electronic device. Accordingly, the electronic device may change the state of the provider profile into the disabled state 720 (different from the enabled state 730 of the SIM card) based on the local status. Furthermore, the electronic device may change the state of the provider profile into the enabled state 730 or maintain the enabled state 730 of the provider profile so that the state of the provider profile is the same as the enabled state 730 of the SIM card 700.

The local status independent of or associated with the state 700 of the SIM card may be changed based on the state 700 of the SIM card. For example, in the case where the state 700 of the SIM card is changed from the enabled state 730 to the disabled state 720, the local status may be changed into the disabled state 720. Accordingly, the state of the provider profile 630 or 670 may be changed into the disabled state 720 so as to be the same as the state 700 of the SIM card. Hereinafter, the state of the provider profile may represent at least one of the local status or the state 700 of the SIM card.

The state of the provider profile 630 or 670 associated with the state 700 of the SIM card may be changed by one or more external devices 102 or 104 or the server 106, the SM-SR 560, the MNO 570, or the third-party service provider 580, or may be changed by a user input (e.g., a touch) occurring on the electronic device 400. For example, the state of the provider profile may be changed based on a command received from the external device or a command generated by the user input. The user interface displayed on the electronic device may be changed according to the changed state of the provider profile.

Figure 8:
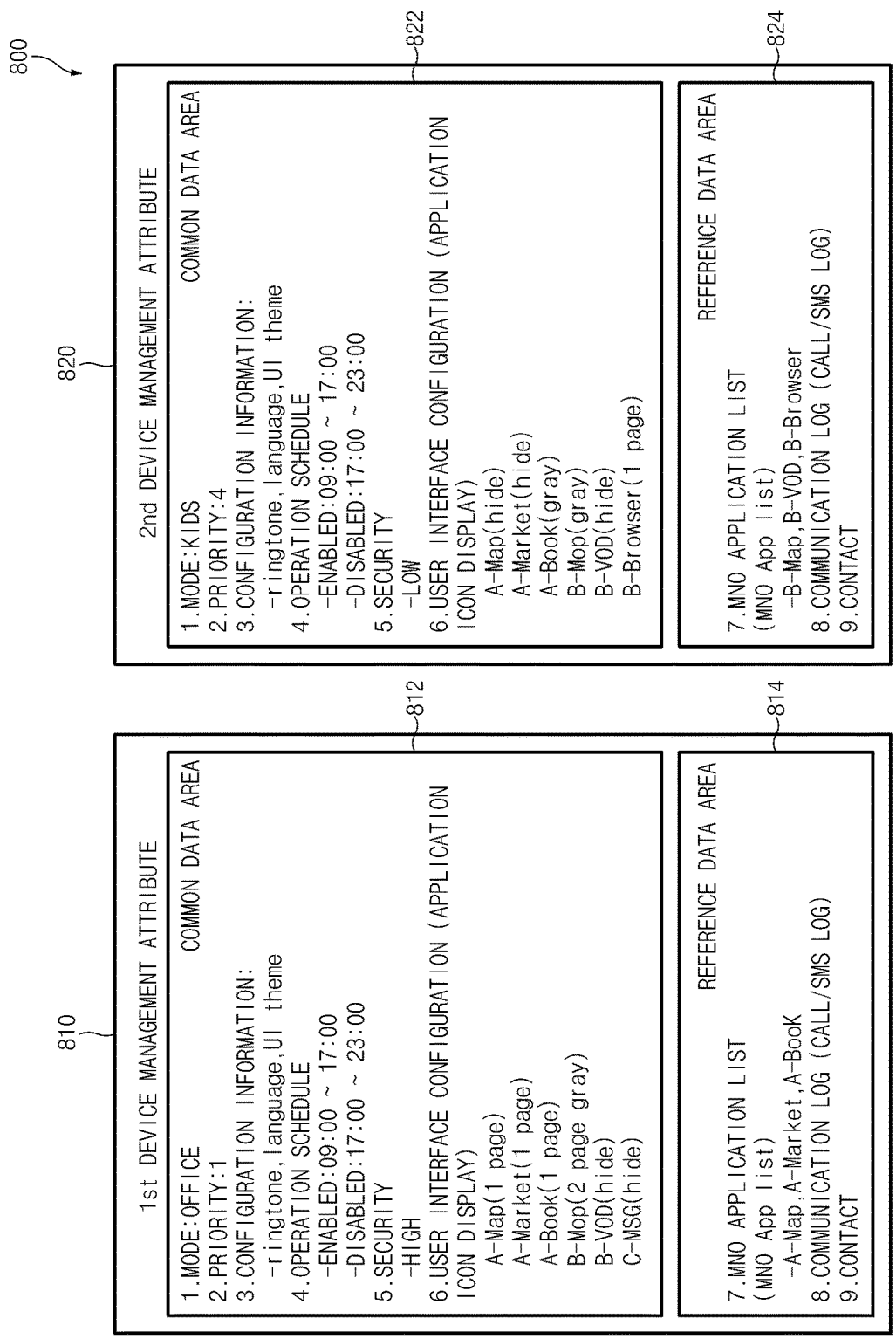
FIG. 8 is a diagram illustrating a structure of a device management attribute, according to an embodiment of the present disclosure.

FIG. 8 is a diagram illustrating a structure of a device management attribute 800 (e.g., a device profile), according to an embodiment of the present disclosure. Referring to FIG. 8, the device management attribute 800 includes, for example, a first device management attribute 810 and a second device management attribute 820. Each of the first and second device management attributes 810 and 820 may include common data areas 812 and 822 and reference data areas 814 and 824, respectively. An electronic device 400 may check information included in the common data area 812 or 822 (e.g., a mode, a priority order, configuration information, a schedule, security, or a user interface configuration) with information included in the reference data area 814 or 824 (e.g., contact information, a communication log, or a list of applications associated with a communications service provider). The electronic device may check the information included in the reference data area 814 or 824 after checking the information included in the common data area 812 or 822. The device management attribute 800 may be generated in a format similar to that of the provider profile 630 or 670.

The device management attribute 800 may be generated in the case where the provider profile 630 or 670 is installed. For example, in the case where the provider profile is downloaded and installed based on information (e.g., provider profile information) received from an external device, the device management attribute 800 associated with the provider profile may be generated. Furthermore, the device management attribute 800 may include information related to the provider profile. The device management attribute 800 may be, for example, a set of various pieces of information such as user information, display information, application information, configuration information, or attribute information of the provider profile.

The device management attribute 800 may be associated with the provider profile (e.g., the provider profile 630 or 670) so that the user interface of the electronic device (e.g., the electronic device 400) corresponding to the device management attribute 800 may be changed according to a state (e.g., the created state 710, the disabled state 720, the enabled state 730, or the deleted state 740) of the provider profile. For example, in the case where the state of the provider profile is changed, or the provider profile is used as a main provider profile, the user interface may be changed based on the device management attribute 800 associated with the provider profile.

At least a part of the common data area 812 or 822 may be included in the device management attribute 800, or the common data area 812 or 822 may not be included therein. At least a part of the reference data area 814 or 824 may be included in the device management attribute 800, or the reference data area 814 or 824 may not be included therein. For example, the first device management attribute 810 may not include the reference data area 814, but may include the common data area 812 alone. Alternatively, the first device management attribute 810 may not include the common data area 812, but may include the reference data area 814 alone. As described above, a configuration of the device management attribute 800 may vary with the type of an electronic device, a user, or a communications service provider.

The device management attribute 800 may include various information related to the provider profile 630 or 670. For example, the device management attribute 800 may include at least one of configuration information, a schedule, or a priority order to be applied to an electronic device 400 corresponding to the device management attribute 800, a security or mode associated with the provider profile (e.g., a SIM) information, a configuration of the user interface, a list of applications associated with the communications service provider, a communication log generated in the electronic device, or contact information. The mode associated with the provider profile may be added. The mode may represent the scope of use of the provider profile in the electronic device corresponding to the device management attribute 800. For example, the mode may include an office mode, a home mode, a kids mode, or a public mode. The priority order may be used to select the device management attribute 800 for controlling the electronic device, from among the device management attributes 800 associated with provider profiles that are in an enabled state 730. For example, the priority order may be provided as information (e.g., a character, a number, or a symbol) indicating a priority level of the device management attribute 800 or the provider profile. In the case where the provider profile is in the enabled state, the configuration information may include information set or changed in the electronic device 400 corresponding to the device management attribute 800. For example, the configuration information may include a theme, a language, or a ringtone of the electronic device.

The schedule may include information (e.g., a time, a place, or a situation) for applying the state (e.g., the enabled state 730 or the disabled state 720) of the provider profile to the electronic device. For example, the electronic device may change the user interface of the electronic device by changing the state of the provider profile into the enabled or disabled state based on a time, a place or a situation (e.g. a meeting) included in the schedule. Times, places, or situations in which the enabled state 730 or the disabled state 720 are applied to the electronic device may overlap with each other. In the case where the times, places, or situations in which the enabled state 730 or the disabled state 720 is applied to the electronic device overlap with each other, the electronic device may change the user interface using the priority order information additionally.

The security may represent a security level of the device management attribute 800 or the provider profile associated with the device management attribute 800. For example, information identifiable in the electronic device may be changed according to the security level. In the case where the provider profile to which the device management attribute 800 with the kids mode is applied is used in the electronic device, information generated by the provider profile to which the device management attribute 800 with the office mode is applied is unable to be identified in the electronic device.

An area for storing information generated in the electronic device may be changed according to the security level. For example, information generated by the provider profile to which the device management attribute 800 with the home mode is applied may be stored in a non-secure storage area, and information generated by the provider profile to which the device management attribute 800 with the office mode is applied may be stored in a secure storage area (e.g., KNOX®). The configuration of the user interface may include detailed information of the user interface to be changed according to the provider profile that is in the enabled state. The configuration of the user interface may include icon display information associated with an application included in the electronic device. For example, a first group of the configuration of the user interface may include applications related to books, markets, or a map A, and the applications of the first group may be displayed on a first page of the electronic device. A second group of the configuration of the user interface may include applications related to videos or a map B. The map B application may be displayed on the first page of the electronic device, and the video application may be displayed on a second page in gray color.

The configuration of the user interface may include a layout of the user interface displayed on the electronic device, a content type, an image, an icon, a widget, or the like. Furthermore, the configuration of the user interface may include information related to a screen (e.g., a user interface) provided to a user, and may include information displayed on a display operatively connected to the electronic device. The list of applications associated with the communications service provider may include application information associated with an MNO (e.g., the MNO 570). For example, the list of applications may include a map application (e.g., T-map) of a first MNO or a book application (e.g., ebook) of a second MNO. The communication log or contact information generated in the electronic device may include information generated in the electronic device using the provider profile. For example, the communication log or contact information may include a log of communications (e.g., a call log, a short message service (SMS) log, a social network service (SNS) log, or the like) received/sent through the provider profile or contact information associated with the provider profile. The information associated with the provider profile may include information (e.g., a signal strength, a lock setting, or the like) displayed or generated in the electronic device in addition to the above-mentioned information.

the information (e.g., a priority order, a schedule, configuration information, a mode, security, a user interface configuration, an application list, a communication log, contact information, or the like) associated with the provider profile and included in the device management attribute 800 may be included at least one of the common data area 812 or 822 or the reference data area 814 or 824. For example, the common data area 812 or 822 may include the mode, priority order, schedule, configuration information, security, or user interface configuration, and the reference data area 814 or 824 may include the application list, communication log, or contact information.

A part of the information (e.g., a priority order, a schedule, configuration information, a mode, security, a user interface configuration, an application list, a communication log, contact information, or the like) associated with the provider profile and included in the device management attribute 800 may be changed by an external input (e.g., a user input) after the device management attribute 800 is generated. For example, the mode information or security information (e.g., office mode, kids mode, low level, or high level) among pieces of the information related to the provider profile may be added to the device management attribute 800 after the device management attribute 800 is generated. After the device management attribute 800 is generated without including a value related to the mode, a specific value (e.g., an office mode or kids mode) corresponding to a user input may be added as the mode information. The electronic device may display a user interface based on the mode information. After the device management attribute 800 is generated without including a value related to the security, a specific value (e.g., low or high security) corresponding to a user input may be added as the security information. The electronic device may display the user interface based on the security information.

Figure 9A:
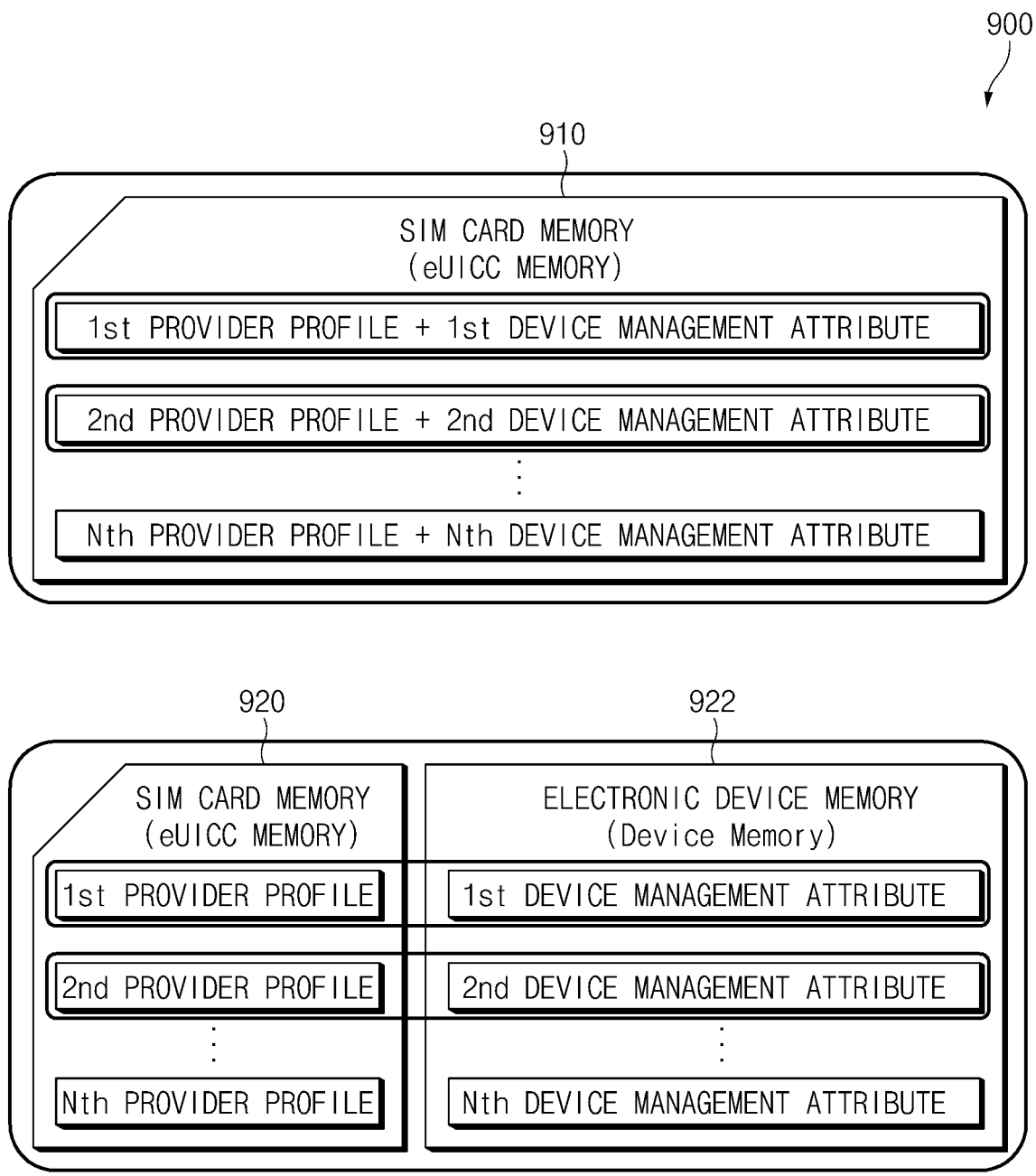
FIGS. 9A-9C are diagrams illustrating an operation of storing a device management attribute in an electronic device, according to an embodiment of the present disclosure.
Figure 9B:
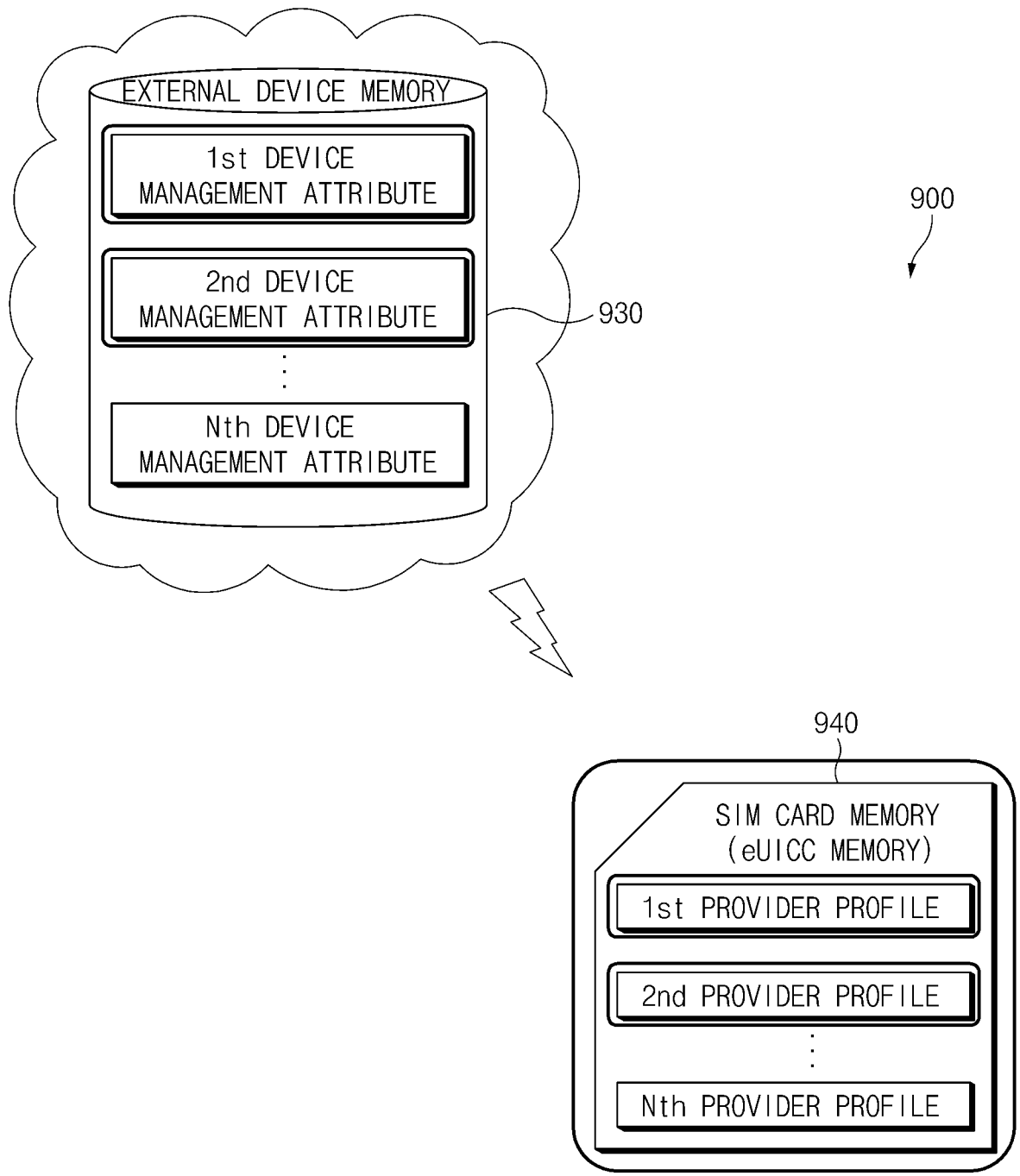
Figure 9C:
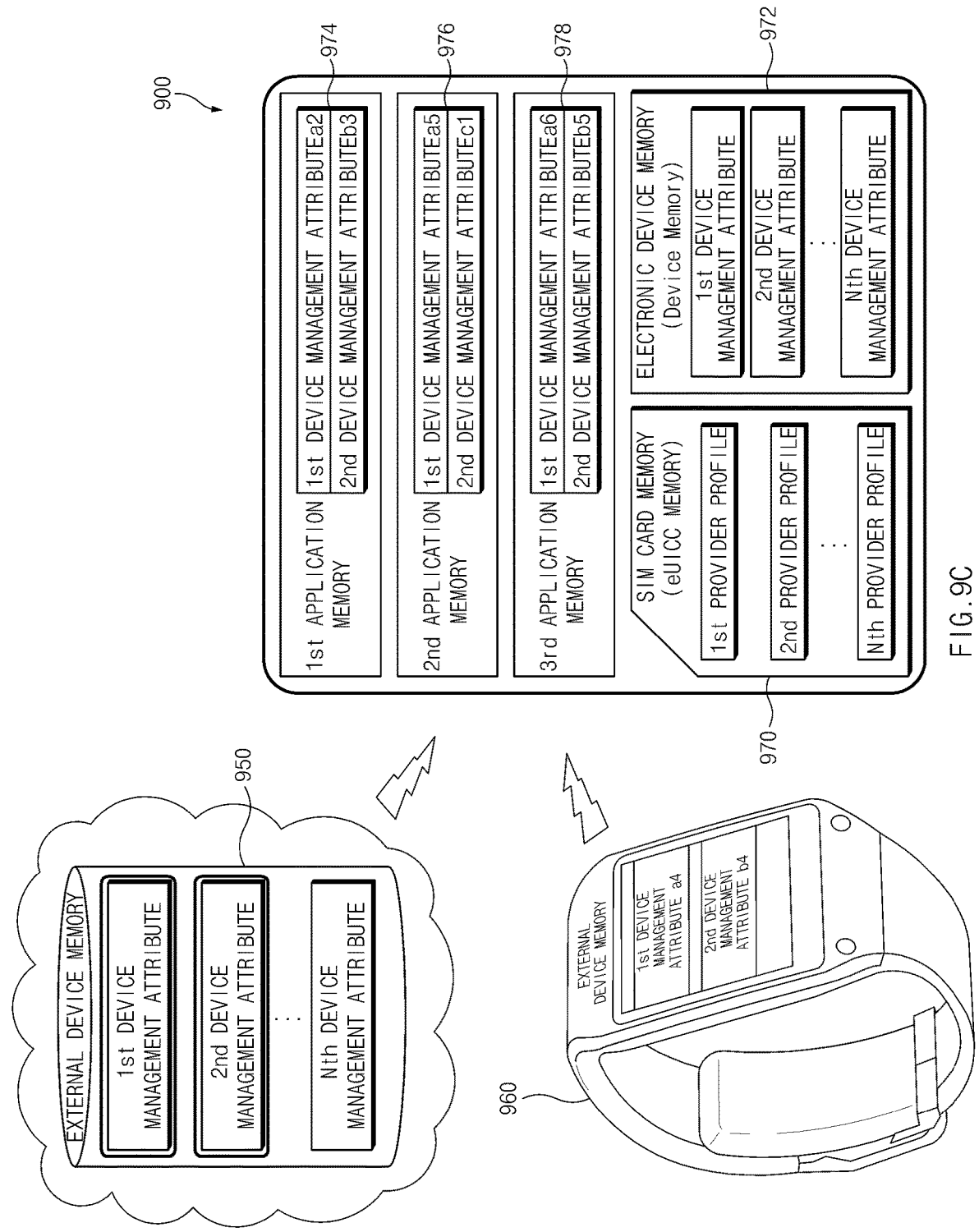

FIGS. 9A-9C are diagrams illustrating an operation of storing a device management attribute (e.g., a device profile) in an electronic device, according to an embodiment of the present disclosure. Referring to FIGS. 9A-9C, the device management attribute may be stored, for example, in an electronic device 900 (e.g., the electronic device 400) or one or more external devices 102 or 104 or the server 106. A part or the entirety of the device management attribute may be stored in the electronic device 900 or the external device. A manager module 436 of the electronic device 900 may store a location (e.g., a SIM card memory 910, 920, 940, or 970, an electronic device memory 922 or 972, an external device memory 930, 950, or 960, the internal memory 232, the external memory 234, an application memory 974, 976, or 978, or the like) in which the device management attribute is stored. The manager module may store information on or determine what device management attribute is generated in the electronic device 900 or what state (e.g., the created state 710, the disabled state 720, the enabled state 730, or the deleted state 740) the device management attribute has. For example, the manager module may check a state (e.g., the created state 710, the disabled state 720, the enabled state 730, or the deleted state 740) of a provider profile included in a SIM card and/or a provider profile used as a main profile among a plurality of provider profiles. In the case where the plurality of provider profiles are present, the electronic device 900 may selectively use the plurality of provider profiles based on a user input or information received from the external device. For example, the electronic device 900 may classify the plurality of provider profiles into a main provider profile and a sub provider profile so that the main provider profile is used mainly or preferentially over the sub provider profile in the electronic device 900.

The device management attribute may be stored with a provider profile 630 or 670 as one set. For example, a first provider profile and a first device management attribute may include information associated with each other as one set. Furthermore, a second provider profile and a second device management attribute may include information associated with each other as one set.

Referring to FIG. 9A, the device management attribute may be stored in the SIM card memory 910 or 920 or the electronic device memory 922. For example, a provider profile 630 or 670 and the device management attribute associated with the provider profile may be stored together in the SIM card memory 910. Furthermore, each of the SIM card memories 910 and 920 may include a plurality of provider profiles. The SIM card memory 910 or 920 may include an ISD-P 650 of FIG. 6 of a SIM card.

The device management attribute may be stored in the electronic device memory 922. For example, among the SIM card memory 920 and the electronic device memory 922, the SIM card memory 920 may store the provider profile, and the electronic device memory 922 may store the device management attribute associated with the provider profile. Through organizational data linkage between the SIM card memory 920 and the electronic device memory 922, a user may manage a user interface displayed on the electronic device 900 using the device management attribute and the provider profile stored in an individual area (e.g., the SIM card memory 920 or the electronic device memory 922). The electronic device memory 922 may include a memory 130, 230, 232, 234 included in the electronic device 900, a nonvolatile memory, or a flash memory.

Referring to FIG. 9B, the device management attribute may be stored in the external device memory 930. For example, among the SIM card memory 940 and the external device memory 930, the SIM card memory 940 may store the provider profile, and the external device memory 930 may store the device management attribute associated with the provider profile. Through organizational data linkage between the SIM card memory 940 and the external device memory 930, the user may manage the user interface displayed on the electronic device 900 using the device management attribute and the provider profile stored in an individual area (e.g., the SIM card memory 930 or the external device memory 930). The external device memory 930 may include a memory of one or more external devices 102 or 104 or the server 106 or a memory of a cloud server.

A part or the entirety of the device management attribute may be transferred to the external device via a communication module 420. For example, a manager module 436 included in the electronic device 900 may generate the device management attribute associated with the provider profile, and may transfer, via the communication module, a part or the entirety of the device management attribute to the external device connected to the communication module by a network (e.g., the network 162). The device management attribute may be generated in the electronic device 900 or the external device by the manager module.

Referring to FIG. 9C, the device management attribute may be stored in at least one of the external device memory 950 or 960, the electronic device memory 972, or the application memory 974, 976, or 978. For example, among the SIM card memory 970, the external device memory 950 or 960, the electronic device memory 972, and the application memory 974, 976, or 978, the SIM card memory 970 may store the provider profile, and the external device memory 950 or 960, the electronic device memory 972, and the application memory 974, 976, or 978 may store the device management attribute associated with the provider profile. Through organizational data linkage among the SIM card memory 970, the external device memory 950 or 960, the electronic device memory 972, and the application memory 974, 976, or 978, the user may manage the user interface displayed on the electronic device 900 using the device management attribute and the provider profile stored in an individual area (e.g., the external device memory 950 or 960, the electronic device memory 972, or the application memory 974, 976, or 978).

The device management attribute may be distributively stored in the SIM card memory 970, the external device memory 950 or 960, the electronic device memory 972, and the application memory 974, 976, or 978. For example, the first device management attribute associated with the first provider profile, which is stored in the SIM card memory 970, may be divided into first device management attributes a1-a6. Information included in each of the first device management attributes a1-a6 may include pieces of information (e.g., a priority order, a schedule, configuration information, a mode, security, a user interface configuration, an application list, a communication log, contact information, or the like) included in the device management attribute (e.g., the device management attribute 800). Furthermore, the information included in each of the first device management attributes a1 to a6 may have the same information.

The first device management attributes a1-a6 may be distributively stored such that the first device management attribute a1 is stored in the electronic device memory 972, the first device management attribute a2 is stored in the first application memory 974, the first device management attribute a3 is stored in the external device memory 950, the first device management attribute a4 is stored in the external device memory 960, the first device management attribute a5 is stored in the second application memory 976, and the first device management attribute a6 is stored in the third application memory 978.

The electronic device 900 may check the location of the device management attribute associated with the provider profile according to a change in the provider profile. For example, in the case where information of a provider profile (e.g., communications service provider information, roaming information, authentication information, or the like) that is enabled or used as a main profile is changed, the location of the device management attribute associated with the changed information (e.g., communications service provider information, roaming information, authentication information, or the like) may be checked. Accordingly, the electronic device 900 may issue instructions to change the device management attribute to the location (e.g., the SIM card memory 970, the external device memory 950 or 960, the electronic device memory 972, or the application memory 974, 976, or 978) or may change information included in the device management attribute. Furthermore, according to a changed device management attribute, the user interface displayed on the electronic device 900 may be changed.

Figure 10:
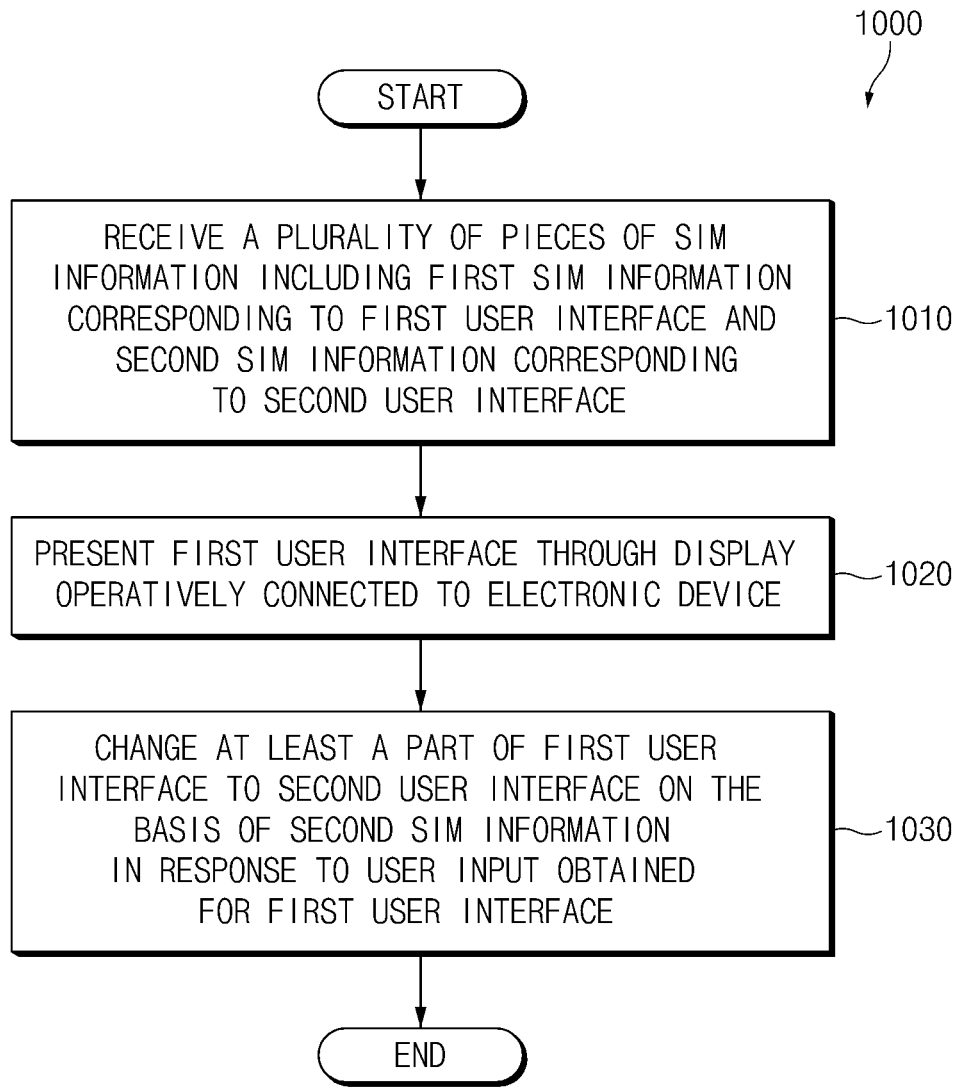
FIG. 10 is a flowchart illustrating a method for displaying a user interface in an electronic device, according to an embodiment of the present disclosure.

FIG. 10 is a flowchart illustrating a method for displaying a user interface in an electronic device, according to an embodiment of the present disclosure. Referring to FIG. 10, in operation 1010, the electronic device (e.g., the electronic device 400) receives a plurality of pieces of subscriber identification module information including first subscriber identification module information corresponding to a first user interface and second subscriber identification module information corresponding to a second user interface The first subscriber identification module information and the second subscriber identification module information may be received from, for example, the MNO 570 or the third-party service provider 580 of FIG. 5, and the received first subscriber identification module information and second subscriber identification module information may be installed in the electronic device. The first subscriber identification module information and the second subscriber identification module information may include information that is the same as or similar to that of the provider profile 540 of FIG. 5. The electronic device may generate a first device management attribute associated with the first subscriber identification module information based on the first subscriber identification module information. Furthermore, the electronic device may generate a second device management attribute associated with the second subscriber identification module information based on the second subscriber identification module information.

The electronic device may manage a user interface displayed on the electronic device based on the first device management attribute or the second device management attribute. For example, the electronic device may change a first user interface associated with the first subscriber identification module information based on the first device management attribute. Furthermore, the electronic device may change a second user interface associated with the second subscriber identification module information based on the second device management attribute.

In operation 1020, the electronic device presents, for example, the first user interface through a display operatively connected to the electronic device. The first user interface may display a screen associated with the first subscriber identification module information through the display operatively connected to the electronic device. The first user interface may include a text, an image, an icon, a widget, a homepage, a background image, or the like. The electronic device may change, based on the first device management attribute associated with the first subscriber identification module information, a size, display position, transparency, luminosity, or color of at least a part of the first user interface displayed through the display, or content displayed on at least a part of the first user interface, or a visual effect for the content.

The electronic device may change the first user interface based on the first device management attribute associated with the first subscriber identification module information. For example, the electronic device may additionally display at least one of a widget, an icon, an image, or a text not displayed on the display, or may hide from a user's view or delete from the first user interface the at least one of the widget, icon, image, or text.

In operation 1030, the electronic device changes at least a part of the first user interface associated with the second subscriber identification module information to the second user interface in response to a user input (e.g., a touch, a double touch, a long press, a touch and swipe leftwards/rightwards, a gesture, or drag-and-drop) to the first user interface. While displaying the first user interface through the display, the electronic device may change at least a part of the first user interface to the second user interface associated with the second subscriber identification module information in response to the user input. In relation to this operation, the electronic device may replace the first interface with the second interface or may display both the first and second interfaces on the display.

Figure 11:
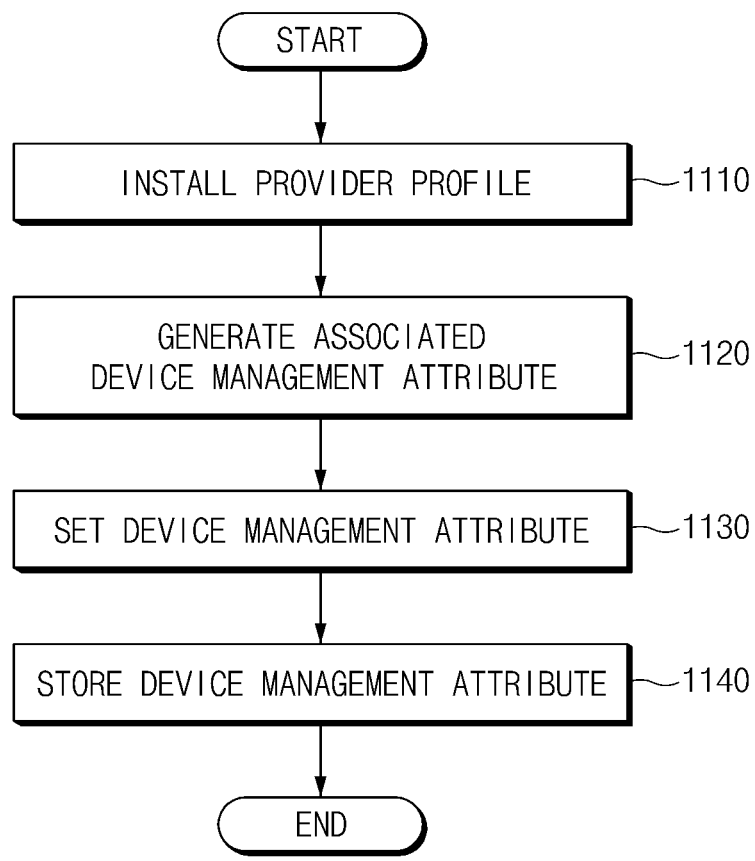
FIG. 11 is a flowchart illustrating a method for generating a device management attribute in an electronic device, according to an embodiment of the present disclosure.

FIG. 11 is a flowchart illustrating a method for generating a device management attribute in an electronic device, according to an embodiment of the present disclosure. Referring to FIG. 11, in operation 1110, the electronic device 400 receives a provider profile from one or more external devices 102 or 104 or the server 106. The electronic device may install the received provider profile in a SIM card so as to provide to a user a service associated with the received provider profile.

In operation 1120, the electronic device generates a device management attribute associated with the provider profile installed in the SIM card. The device management attribute may include information that is the same as or similar to that of the provider profile, or may include the device management attribute 800 of FIG. 8.

In operation 1130, the electronic device sets or changes the device management attribute based on information received from an external device, information set (in advance) in the electronic device, or a user input (e.g., a touch, a double touch, a long press, a touch and swipe leftwards/rightwards, a gesture, or drag-and-drop). The device management attribute may be changed based on default information received from the external device, modified information received from the external device, default information set in advance in the electronic device, or information modified by the user.

In operation 1140, the electronic device stores the device management attribute in the electronic device or the external device so that the device management attribute may be used. The device management attribute may be stored in the storage area illustrated in FIG. 9 (e.g., the SIM card memory 910, 920, 940, or 970, the electronic device memory 922 or 972, the external device memory 930, 950, or 960, the internal memory 232, the external memory 234, or the application memory 974, 976, or 978).

Figure 12A:
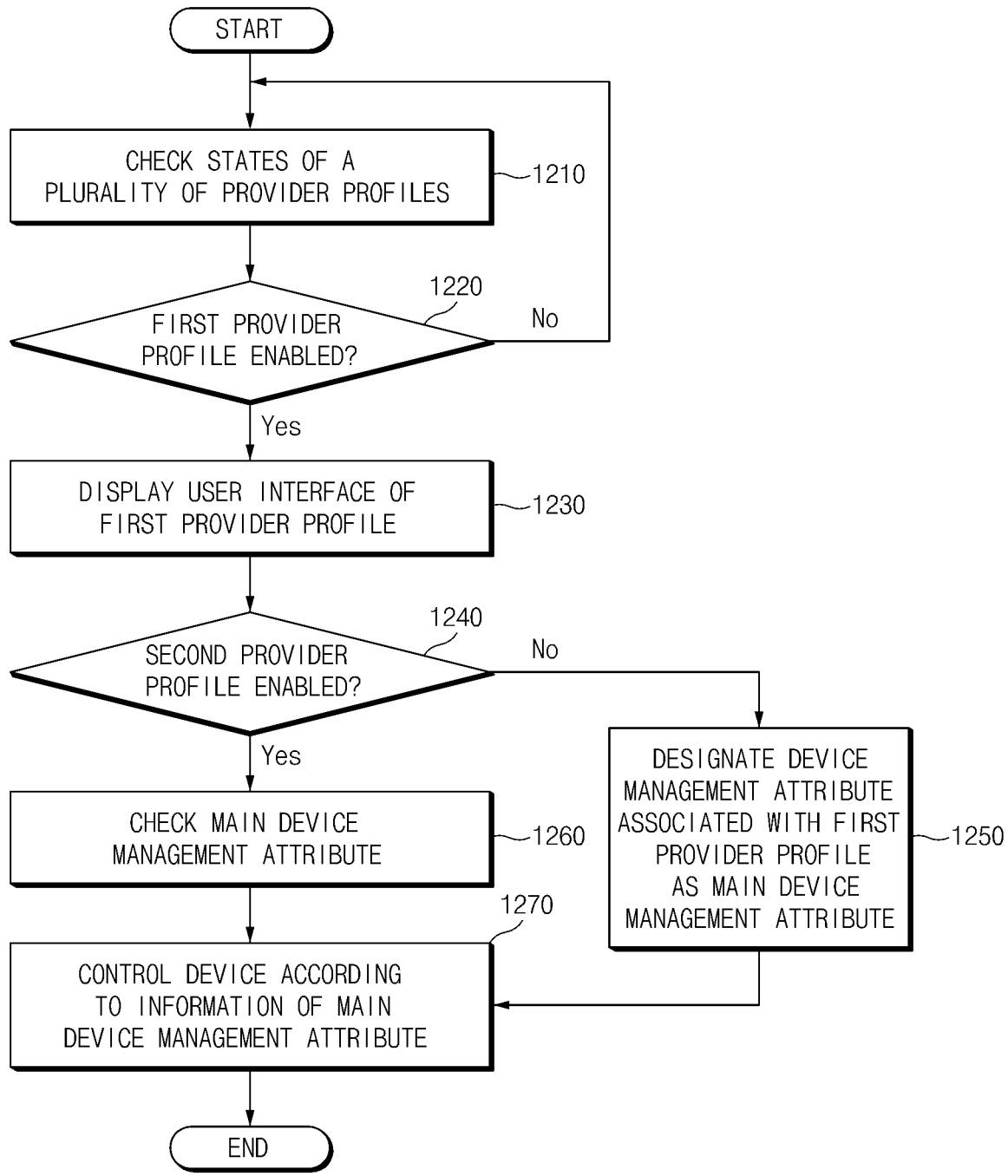
FIG. 12A is a flowchart illustrating a method for modifying a device management attribute in an electronic device, according to an embodiment of the present disclosure.

FIG. 12A is a flowchart illustrating a method for changing a device management attribute in an electronic device, according to an embodiment of the present disclosure. Referring to FIG. 12A, in operation 1210, the electronic device (e.g., the electronic device 400) checks states of a plurality of provider profiles stored (e.g., installed) in a SIM card (e.g., the SIM card 411) of the electronic device.

In operation 1220, the electronic device determines whether a first provider profile is in an enabled state.

If it is determined that the first provider profile is in the enabled state in operation 1220, the electronic device displays a user interface based on a device management attribute associated with the first provider profile in operation 1230.

If it is determined that the first provider profile is not in the enabled state in operation 1220, the electronic device performs operation 1210. The electronic device may check the states of the plurality of provider profiles stored in the SIM card of the electronic device again.

In operation 1240, the electronic device determines whether a second provider profile is in the enabled state.

If it is determined that the second provider profile is not in the enabled state in operation 1240, the electronic device designates a device management attribute associated with the enabled first provider profile as a main device management attribute in operation 1250. In the case where the plurality of provider profiles are present, a plurality of device management attributes corresponding to the plurality of provider profiles respectively may be generated, and a user interface may be managed by a main device management attribute among the plurality of device management attributes.

If it is determined that the second provider profile is in the enabled state in operation 1240, the electronic device confirms a main device management attribute among a first device management attribute associated with the first provider profile and a second device management attribute associated with the second provider profile in operation 1260. In the case where a plurality of provider profiles are in the enabled state, the electronic device may confirm a main provider profile among the plurality of provider profiles and, accordingly, may confirm a main device management attribute associated with the main provider profile.

In operation 1270, the electronic device manages the user interface of the electronic device based on the main device management attribute. If the main provider profile among the plurality of provider profiles in the enabled state is the first provider profile, the electronic device may manage the user interface based on the first device management attribute. Likewise, if the main provider profile is the second provider profile, the electronic device may manage the user interface based on the second device management attribute.

Figure 12B:
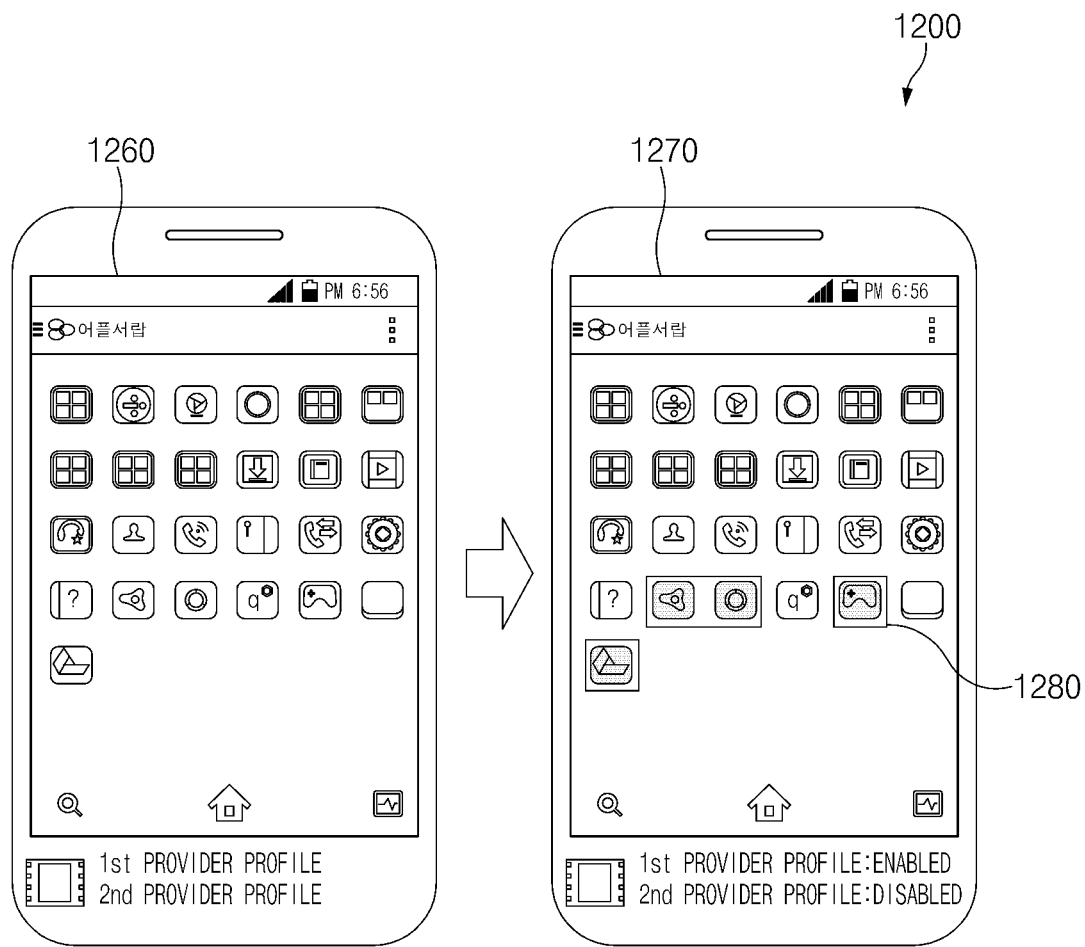
FIG. 12B is a diagram illustrating a user interface modified based on a change in a device management attribute in an electronic device, according to an embodiment of the present disclosure.

Referring to FIG. 12B, which is a diagram illustrating a user interface modified based on a change in a device management attribute in an electronic device, according to an embodiment of the present disclosure, an electronic device may display a part or the entirety of a user interface changed according to a change in a device management attribute.

The electronic device may change a user interface 1260 to a user interface 1270 based on a change in a device management attribute. The electronic device may display, through a display, the user interface 1260 associated with a first provider profile based on the first provider profile in an enabled state among a plurality of provider profiles. Furthermore, the electronic device may change a state (e.g., an enabled state, a disabled state, or the like) of at least one of the plurality of provider profiles based on information received from an external device or a user input (e.g., a touch, a double touch, a long press, a touch and swipe leftwards/rightwards, a gesture, or drag-and-drop). The electronic device may change a state of a SIM card (e.g., the state 700 of FIG. 7) based on the information received from the external device or the user input.

The electronic device may disable the first provider profile that is in the enabled state and may enable a second provider profile that is in a disabled state. Accordingly, the electronic device may display the user interface 1270 associated with the enabled second provider profile through the display. Furthermore, in the case where the user interface 1260 is changed to the user interface 1270, the electronic device may display applications 1280 associated with the first provider profile on the user interface 1270 differently from information displayed on the user interface 1260. For example, the electronic device may display the applications 1280 on the user interface 1270 so that at least a portion of the applications 1280 is different from the information displayed on the user interface 1260 with respect to color, luminosity, transparency, display position, size, or visual effect (e.g., shade). Alternatively, the electronic device may display, on the user interface 1270, at least one of a widget, an icon, an image, or a text of at least a portion of the applications 1280 associated with the first provider profile, or may hide from user's view or delete from the user interface 1270 the at least one of the widget, icon, image, or text.

The electronic device may change a main provider profile among a plurality of provider profiles installed in the SIM card. For example, in the case where a plurality of enabled provider profiles are present, the electronic device may change the main provider profile from an enabled first provider profile to an enabled second provider profile. If the main provider profile is changed from the first provider profile to the second provider profile, the electronic device may display a part or the entirety of a user interface associated with the second provider profile through the display.

The electronic device may determine a time for performing an operation of changing a device management attribute generated in the electronic device. For example, if the electronic device is supplied with power, the electronic device may perform the operation of changing a device management attribute generated in the electronic device. Provider profiles installed in the electronic device may be displayed through a user interface, and a provider profile to be enabled may be determined based on a user input received through the user interface. Furthermore, the user interface may be displayed based on a device management attribute associated with the determined provider profile.

The electronic device may determine a time for performing an operation of changing a device management attribute generated in the electronic device. For example, the electronic device may perform the operation of changing a device management attribute based on a state of a network (e.g., a network of an MNO) associated with an enabled provider profile in the electronic device. The electronic device may check the state of the network, and, if the state (e.g., a signal state) of the network is not good (e.g., weak electric field), the electronic device may check a state of a network of other provider profiles installed in the electronic device, and may provide a list of the other provider profiles to a user.

The electronic device may configure at least one provider profile selected by a user input from the list of the other provider profiles so that the at least one provider profile may be used in the electronic device. Through this configuration, a state of the at least one provider profile in the list of the other provider profiles may be changed to an enabled state. Alternatively, the electronic device may install, in the electronic device, at least one provider profile in a list of new provider profiles, and may provide, to the user, a user interface associated with the at least one provider profile installed in the electronic device. The electronic device may determine a network state corresponding to the enabled provider profile based on a value (e.g., a numerical value, a signal strength, a network congestion, or the like) predefined in the electronic device. Alternatively, the electronic device may determine the network state corresponding to the enabled provider profile relative to a network state of another provider profile installed in the electronic device.

The electronic device may determine a time for performing an operation of changing a device management attribute generated in the electronic device. For example, the electronic device may perform the operation of changing a device management attribute based on a provider profile installed in the electronic device or a device management attribute associated with the provider profiled installed. The electronic device may change a device management attribute using a provider profile installed in the electronic device or payment information included in the device management attribute associated with the provider profile installed. For example, in the case where a user executes a specific application, the electronic device may check payment information related to the specific application, and may provide, to the user, a provider profile for which the payment information is low. The electronic device may display, through a user interface, the provider profile for which the payment information is low, and may make a change to a device management attribute associated with the provider profile for which the payment information is low.

Figure 13A:
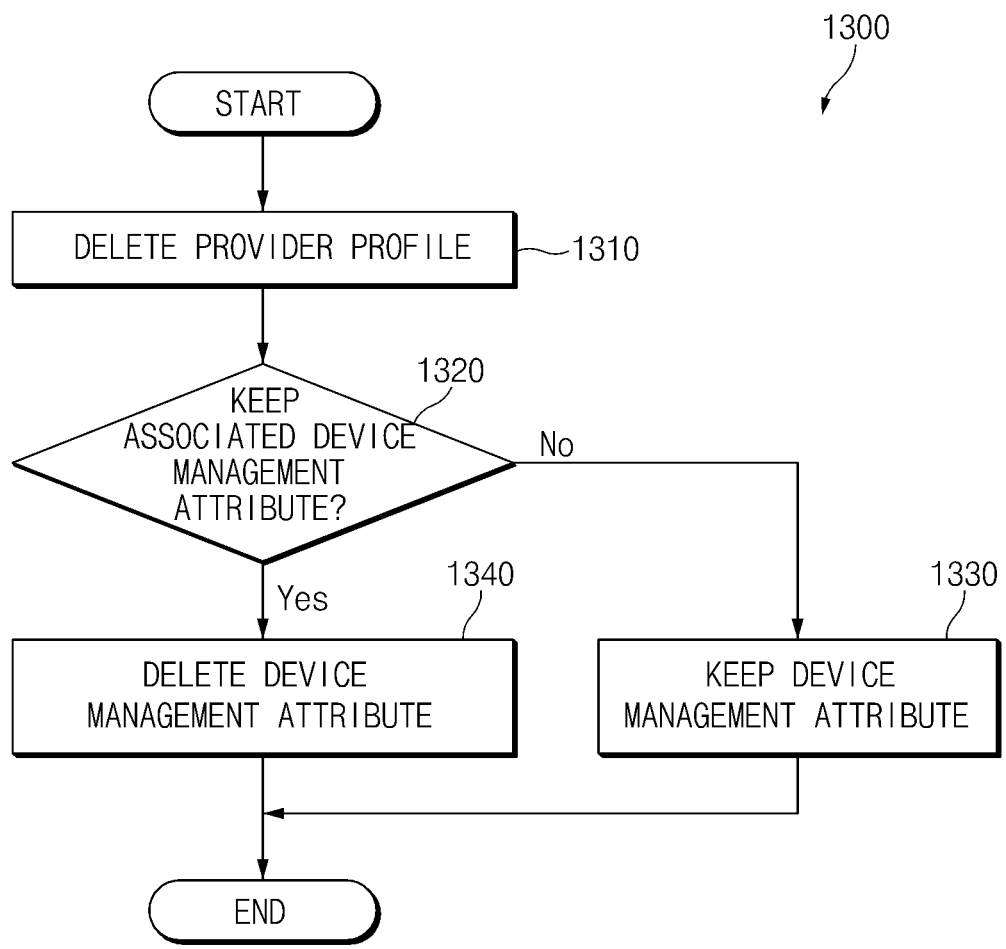
FIG. 13A is a flowchart illustrating a method for deleting a device management attribute in an electronic device, according to an embodiment of the present disclosure.

FIG. 13A is a flowchart illustrating a method for deleting a device management attribute in an electronic device, according to an embodiment of the present disclosure. Referring to FIG. 13A, in operation 1310, the electronic device (e.g., the electronic device 400) deletes a provider profile installed in a SIM card based on information received from an external device or a user input (e.g., a touch, a double touch, a long press, a touch and swipe leftwards/rightwards, a gesture, or drag-and-drop). The electronic device may change a state of the SIM card (e.g., the state 700 of FIG. 7) based on the information received from the external device or the user input.

In operation 1320, the electronic device determines whether to keep a device management attribute associated with the provider profile deleted in operation 1310. The electronic device may determine whether to keep the device management attribute based on the information received from the external device or the user input.

If it is determined that the device management attribute associated with the deleted provider profile should not be kept in operation 1320, the electronic device deletes the device management attribute corresponding to the deleted provider profile among device management attributes stored in the electronic device or the external device in operation 1330. In the case where the device management attribute is deleted, the electronic device may change a part or the entirety of a user interface associated with the deleted device management attribute or the deleted provider profile. For example, in the case where a first provider profile is deleted from a plurality of enabled provider profiles including the first provider profile and a second provider profile, the electronic device may display a user interface associated with the second provider profile. Furthermore, in the case where the first provider profile is a main provider profile, the electronic device may change the main provider profile from the first provider profile to the second provider profile while deleting the first provider profile, and may display the user interface associated with the second provider profile.

The electronic device may determine whether information of a common data area (e.g., the common data area 812 or 822 of FIG. 8) or information of a reference data area (e.g., the reference data area 814 or 824 of FIG. 8) associated with the deleted device management attribute is stored, and may determine whether to store the information of the common data area or the information of the reference data area based on a user input. For example, in the case where the information of the reference data area, which is associated with the deleted provider profile and is accessible by a provider profile other than the deleted provider profile, is stored, the electronic device may determine whether to delete the information of the reference data area based on the user input. If it is determined that the information of the reference data area should not be deleted based on the user input, a storage location of the information of the reference data area may be changed to a device management attribute or a default device management attribute stored in the electronic device.

If it is determined that the device management attribute associated with the deleted provider profile should be kept in operation 1320, the electronic device keeps the device management attribute associated with the deleted provider profile and stored in the electronic device or the external device in operation 1340.

In the case where a provider profile that is identical or similar to the provider profile deleted in operation 1310 is installed, the electronic device reuses the device management attribute stored in operation 1340. If a new provider profile is installed, the electronic device may determine whether a device management attribute stored in the electronic device is reusable without generating a device management attribute associated with the new provider profile. For example, the electronic device may determine whether to reuse the stored device management attribute based on information of the new provider profile (e.g., communications service provider information, roaming information, authentication information, subscriber information, or the like). The electronic device compares the information of the new provider profile (e.g., communications service provider information, roaming information, authentication information, subscriber information, or the like) with the device management attribute stored in operation 1340 so as to determine whether the information of the new provider profile is identical to or similar to that of the provider profile deleted in operation 1310.

If it is determined that the information of the new provider profile is identical to or similar to that of the provider profile deleted in operation 1310, the electronic device may not additionally generate a device management attribute associated with the new provider profile, and may use the device management attribute stored in operation 1340 as the device management attribute associated with the new provider profile. However, if it is determined that the information of the new provider profile is not identical to or similar to that of the provider profile deleted in operation 1310, the electronic device generates the device management attribute associated with the new provider profile based on the information of the new provider profile (e.g., communications service provider information, roaming information, authentication information, subscriber information, or the like).

The electronic device provides a user interface for receiving information indicating whether to use the stored device management attribute of operation 1340. The user interface may display, for example, at least a part of the information of the new provider profile or at least a part of information related to the stored device management attribute. The electronic device uses the stored device management attribute of operation 1340 or generates a new device management attribute instead of using the stored device management attribute of operation 1340, based on a user input to the user interface.

If it is determined that the stored device management attribute is reusable, the electronic device may link the new provider profile to the stored device management attribute, and may change a user interface based on the stored device management attribute. For example, the electronic device may link the new provider profile to the stored device management attribute, and may check information of the common data area 812 or 822 of FIG. 8 or information of the reference data area 814 or 824 of FIG. 8 associated with the stored device management attribute. In the case where the information of the common data area or the information of the reference data area is stored, the electronic device may provide, to the user, information (e.g., a provider application or icon) to be installed or displayed on the user interface using the information of the common data area or the information of the reference data area.

Figure 13B:
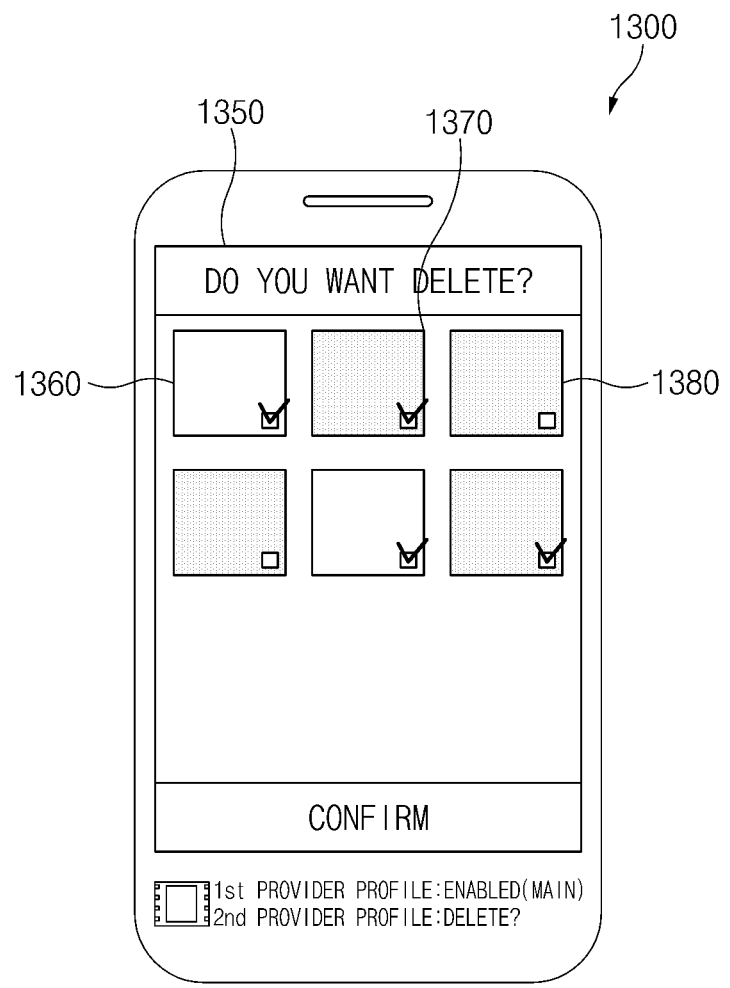
FIG. 13B is diagram illustrating a user interface for deleting a device management attribute, according to an embodiment of the present disclosure.

Referring to FIG. 13B, which is diagram illustrating a user interface for deleting a device management attribute, according to an embodiment of the present disclosure, an electronic device may display a part or the entirety of a user interface for deleting a device management attribute. The electronic device may change a state of an application 1360 that correlates with the device management attribute or a state of an application 1370 or 1380 that does not correlate with the device management attribute using a user interface 1350. An application that correlates with the device management attribute may be, for example, an application included in a list of applications provided by a communications service provider included in the device management attribute. An application that does not correlate with the device management attribute may be, for example, an application not included in the list of applications provided by the communications service provider included in the device management attribute.

The electronic device may display the user interface 1350 based on information (e.g., a list of applications associated with a communications service provider) of the reference data area 814 or 824 of FIG. 8. The electronic device may display the application 1360 that correlates with the device management attribute and the application 1370 or 1380 that does not correlate with the device management attribute such that a representation (e.g., color, luminosity, transparency, display position, size, or visual effect) of the application 1660 differs from that of the application 1370 or 1380.

The electronic device may determine a correlation between the device management attribute and an application (e.g., an application associated with a communications service provider) to determine whether to delete the application. For example, since the application 1360 that correlates with the device management attribute is unable to be used in the electronic device if the device management attribute is deleted, the electronic device may display the user interface 1350 so that the user interface 1350 appears to be disabled (e.g., shaded, in black and white, or darkened) so as not be selected by the user from the user interface 1350. However, even if the device management attribute is deleted, the application 1370 or 1380 that does not correlate with the device management attribute is able to be used in the electronic device based on a device management attribute that differs from the deleted device management attribute. Therefore, the electronic device may display the application 1370 or 1380 so that the application 1370 or 1380 appear to be enabled (e.g., empty check box) so as to be selected by the user from the user interface 1350.

The electronic device may change information (e.g., a priority order, a schedule, configuration information, a mode, security, a user interface configuration, a list of applications associated with a communications service provider, a communication log, or contact information) of the device management attribute. For example, the electronic device may change at least a part of the information of the device management attribute based on a user input or a command or information received from an external device. Furthermore, the electronic device may change a user interface based on the changed device management attribute.

The operations (e.g., operations 1010-1030, 1110-1140, or 1210-1250) of the processes or methods illustrated in FIGS. 10-13B may be performed in a sequential, parallel, iterative or heuristic way. Furthermore, the operations may be performed in another order, or some operations may be omitted, or other operations may be added.

Figure 14:
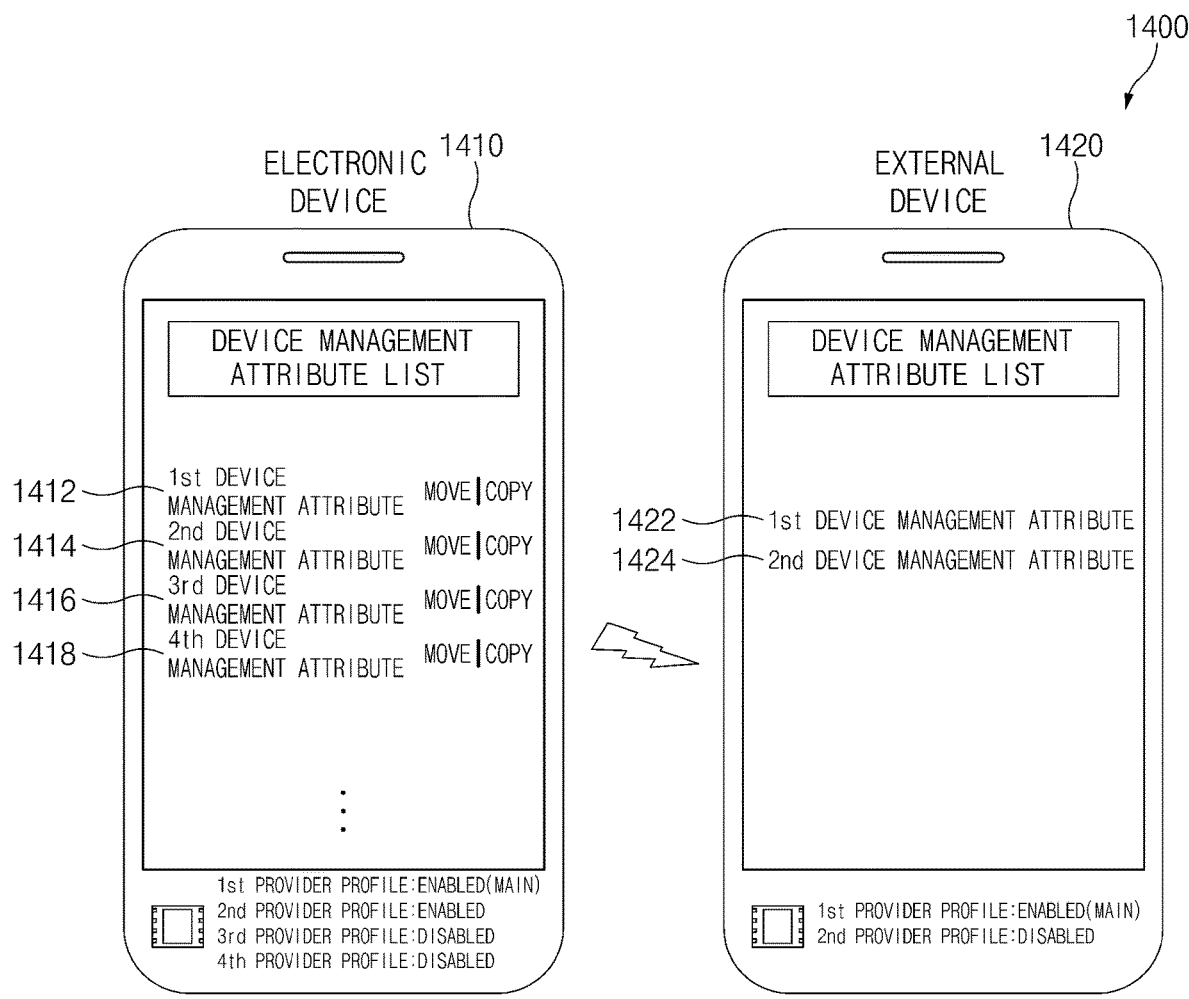
FIG. 14 is a diagram illustrating a moving a device management attribute to another device from an electronic device, according to an embodiment of the present disclosure.

FIG. 14 is a diagram illustrating moving a device management attribute to another device from an electronic device, according to an embodiment of the present disclosure. Referring to FIG. 14, an electronic device 1410 may move or copy at least a portion of device management attributes 1412, 1414, 1416, and 1418 included in the electronic device 1410 to an external device 1420 (e.g., the electronic device 102 or 104 or the server 106) operatively connected to the electronic device 1410. The electronic device 1410 may include the first device management attribute 1412 associated with a first provider profile, the second device management attribute 1414 associated with a second provider profile, the third device management attribute 1416 associated with a third provider profile, or the fourth device management attribute 1418 associated with a fourth provider profile.

The electronic device 1410 may move or copy at least a portion of the device management attributes 1412, 1414, 1416, and 1418 included in the electronic device 1410 to the electronic device 1420 based on a user input. For example, the electronic device 1410 may copy at least one of the first device management attribute 1412 associated with the first provider profile or the second device management attribute 1414 associated with the second provider profile to the external device 1420 using a communication module (e.g., the communication module 420 of FIG. 4) operatively connected to the electronic device 1410. Furthermore, the electronic device 1410 may copy the first device management attribute 1412 and the second device management attribute 1414 to the external device 1420, and may maintain (e.g., in the case of copy) or delete (e.g., in the case of movement) the first device management attribute 1412 and the second device management attribute 1414 included in the electronic device 1410.

The external device 1420 may use the device management attributes received from the electronic device 1410 in the external device 1420. For example, the external device 1420 may install the first provider profile or the second provider profile in the external device 1420. The external device 1420 may associate a first device management attribute 1422 received from the electronic device 1410 with the first provider profile, without generating a device management attribute associated with the first provider profile. Furthermore, the external device 1420 may associate a second device management attribute 1424 received from the electronic device 1410 with the second provider profile, without generating a device management attribute associated with the second provider profile. The first device management attribute 1412 of the electronic device 1410 may be the same as the first device management attribute 1422 of the external device 1420. Likewise, the second device management attribute 1414 of the electronic device 1410 may be the same as the second device management attribute 1424 of the external device 1420.

The external device 1420 may set a specific provider profile among a plurality of provider profiles installed in the external device 1420 as a main provider profile. For example, the external device 1420 may check an enabled provider profile or a provider profile set as a main provider profile, and may display a user interface based on a device management attribute (e.g., the first device management 1422) associated with the enabled provider profile or the main provider profile.

In the case of moving at least one of the device management attributes 1412, 1414, 1416, and 1418, the electronic device 1410 may determine whether a device management attribute moved to the external device 1420 is a device management attribute associated with a main provider profile in the electronic device 1410. For example, in the case where the device management attribute moved to the external device 1420 is the first device management attribute 1412 associated with the main provider profile in the electronic device 1410, the electronic device 1410 may generate a new device management attribute associated with the main provider profile, or may associate a default device management attribute with the main provider profile. Accordingly, the electronic device 1410 may display a user interface based on a device management attribute (e.g., the new device management attribute or the default device management attribute) associated with the main provider profile.

The electronic device 1410 may manage the device management attributes included in the electronic device 1410 based on a provider profile state (e.g., installation) of the external device 1420. For example, in the case where a provider profile included in the electronic device 1410 is deleted based on a user input or information received from an external device, the electronic device 1410 may move a device management attribute associated with the deleted provider profile to the external device 1420. Furthermore, in the case of installing a provider profile that is identical or similar to the provider profile deleted from the external device 1410 in the external device 1420, the external device 1420 may associate the device management attribute received from the electronic device 1410 with the provider profile installed in the external device 1420 so as to display a user interface.

Figure 15:
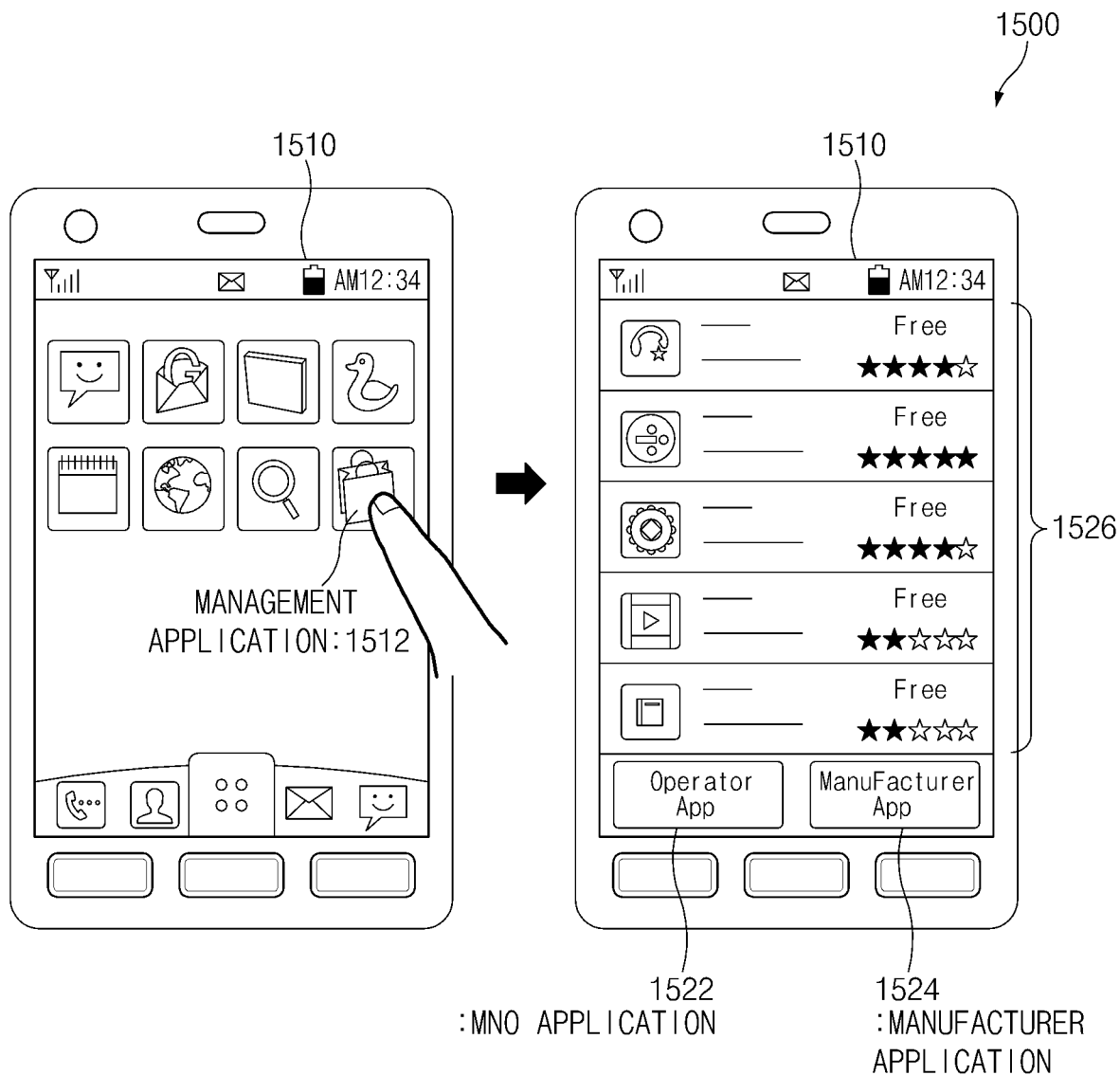
FIG. 15 is a diagram illustrating installing an application corresponding to a device management attribute in an electronic device, according to an embodiment of the present disclosure.

FIG. 15 is a diagram illustrating installing an application corresponding to a device management attribute in an electronic device, according to an embodiment of the present disclosure. Referring to FIG. 15, the electronic device may install a communications service provider application (e.g., T-map, ebook, or the like) associated with a provider profile based on the provider profile installed in the electronic device. The electronic device may receive a provider profile from an external device, and may install the received provider profile in the electronic device. The electronic device may generate a device management attribute associated with the installed provider profile. Furthermore, the electronic device may display a user interface based on the device management attribute. The electronic device may install a management application 1512 (e.g., a market application, a store application, an apps application, or the like) and may display (e.g., in the form of an icon or button) it on a user interface 1510, based on the installed provider profile or the device management attribute. Information (e.g., data) for installing the management application 1512 may be received from the external device or may be included (in advance) in the electronic device. The electronic device may execute the management application 1512 based on a user input.

The electronic device may display a user interface 1520 related to the application 1512 executed based on the user input. For example, the user interface 1520 may include a list icon (e.g., a communications service provider application icon 1522, a manufacturer application icon 1524, or the like) or an application list 1526 related to the list icon. The communications service provider application icon 1522 may be used to display an application associated with a provider profile installed in the electronic device. The manufacturer application icon 1524 may be used to display an application associated with a manufacturer of the electronic device. For example, in the case where a user input occurs on the communications service provider application icon 1522, the electronic device may determine a communications service provider associated with the provider profile installed in the electronic device, and may provide a list of applications associated with services (e.g., map, navigation, market, or ebook) provided by the communications service provider.

Furthermore, in the case where a user input occurs on the manufacturer application icon 1524, the electronic device may determine a manufacturer of the electronic device, and may provide a list of applications associated with services (e.g., map, navigation, market, or ebook) provided by the manufacturer of the electronic device. The electronic device may change information (e.g., a communications service provider application or a manufacturer application) displayed on the application list 1526 associated with the list icon based on a user input. For example, if a user input occurs on the communications service provider application icon 1522, the electronic device may display a communications service provider application (e.g., a map, navigation, market, or ebook application), or, if a user input occurs on the manufacturer application icon 1524, the electronic device may display a manufacturer application (e.g., a map, navigation, market, or ebook application). Furthermore, the electronic device may install at least one of the communications service provider application or the manufacturer application based on a user input that occurs on the application list 1526 associated with the list icon.

The electronic device may change (e.g., delete, add, or the like) the device management attribute based on the communications service provider application or the manufacturer application installed in response to the user input. For example, the electronic device may add or delete, to or from the device management attribute, information associated with at least one of the communications service provider application or the manufacturer application installed in or deleted from the electronic device.

The electronic device may install a communications service provider application (e.g., T-map, ebook, or the like) associated with the provider profile based on a device management attribute generated in the electronic device. The electronic device may receive a provider profile from an external device, and may install the received provider profile in the electronic device. The electronic device may generate a device management attribute associated with the installed provider profile.

Furthermore, the electronic device may display a user interface based on the device management attribute. The electronic device may install an application associated with the provider profile based on information (e.g., a list of communications service provider applications) included in the device management attribute. The electronic device may receive application information (e.g., data) associated with the provider profile from the external device, and may install, in the electronic device, the application associated with the provider profile based on the application information.

Furthermore, the electronic device may automatically or manually perform reception of the application information associated with the provider profile from the external device. For example, the reception of the application information associated with the provider profile from the external device may be performed in the case where the electronic device uses a network of a communications service provider associated with the provider profile or the device management attribute is installed or in response to a user input.

Figure 16:
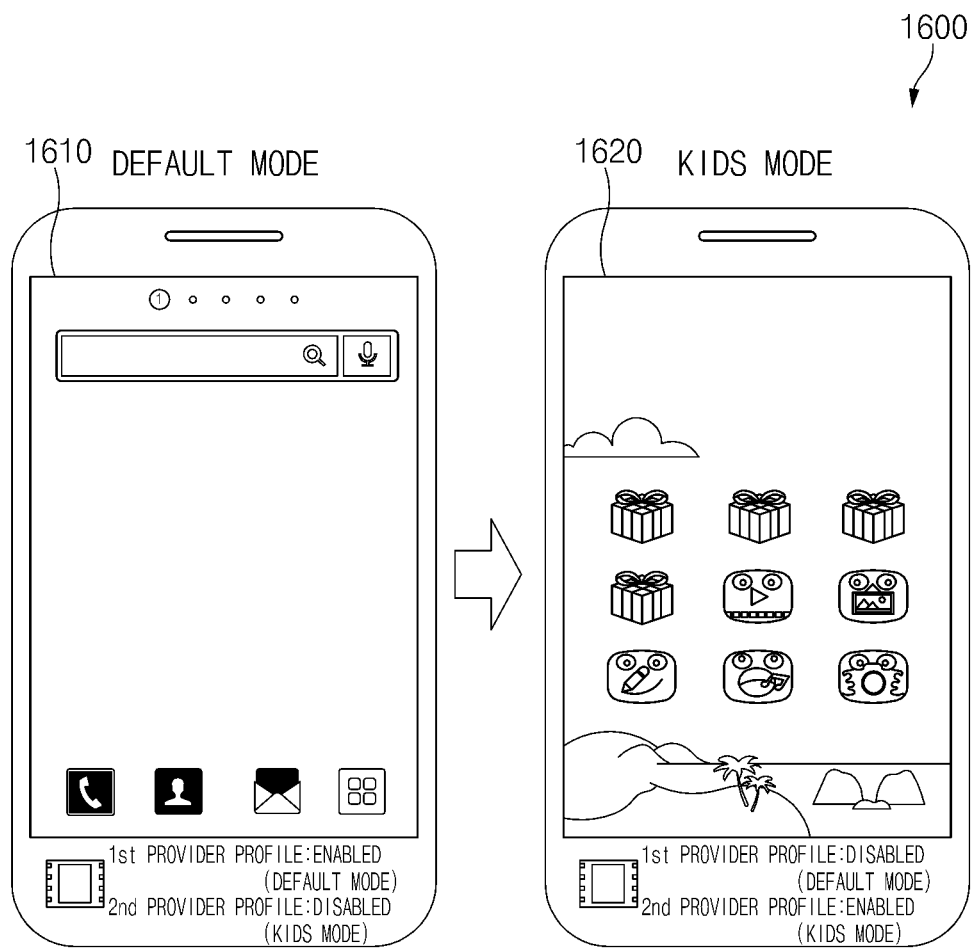
FIG. 16 is a diagram illustrating a user interface changed based on a mode of a device management attribute in an electronic device, according to an embodiment of the present disclosure.

FIG. 16 is a diagram illustrating a user interface changed based on a mode of a device management attribute in an electronic device, according to an embodiment of the present disclosure. Referring to FIG. 16, the electronic device may change a user interface based on a mode among pieces of information included in a device management attribute. The electronic device may include a first provider profile and/or a second provider profile.

The electronic device may determine which of the first and second provider profiles is an enabled provider profile. The electronic device may display a user interface based on the enabled provider profile. The electronic device may check information included in a device management attribute associated with the enabled provider profile, and may change the user interface based on the mode among pieces of the information included in the device management attribute. For example, the electronic device may confirm the first provider profile that is enabled, and may display a default user interface 1610 in the case where the mode of the device management attribute associated with the first provider profile is a default mode.

The electronic device may change an enablement state of a provider profile installed in the electronic device based on a user input or information received from an external device, and may change a user interface based on the changed state of the provider profile. For example, the electronic device may disable the first provider profile that is in an enabled state and may enable the second provider profile that is in a disabled state based on the user input or the information received from external device. Furthermore, the electronic device may confirm a device management attribute associated with the second provider profile enabled. In the case where the mode of the device management attribute associated with the second provider profile is a kids mode, a kids user interface 1620 may be displayed.

The electronic device may include various modes (e.g., a kids mode, an office mode, or a home mode). For example, a user interface displayed on the electronic device may be changed according to the various modes of the electronic device. The mode of the electronic device may be changed to the kids mode among the various modes in response to a user input. Accordingly, the electronic device may check device management attributes generated in the electronic device, and may determine a device management attribute of which mode information indicates a kids mode among the device management attributes. Furthermore, the electronic device may confirm a provider profile associated with the device management attribute of which mode information indicates a kids mode, and may enable the provider profile. Furthermore, the electronic device may display the user interface based on the device management attribute of which mode information indicates a kids mode and which is associated with the enabled provider profile.

The electronic device may change an area (e.g., the non-secure or secure areas 1918, 1928, or 1938 of FIG. 19) for storing information (e.g., download data, a call log, an SMS message, an image, favorites, or the like) generated in the electronic device according to the mode in the device management attribute. For example, in the case where the mode of the device management attribute is the office mode, the information may be stored in a secure area of the electronic device, or, in the case where the mode of the device management attribute is the kids mode, the information may be stored in a non-secure area.

Figure 17:
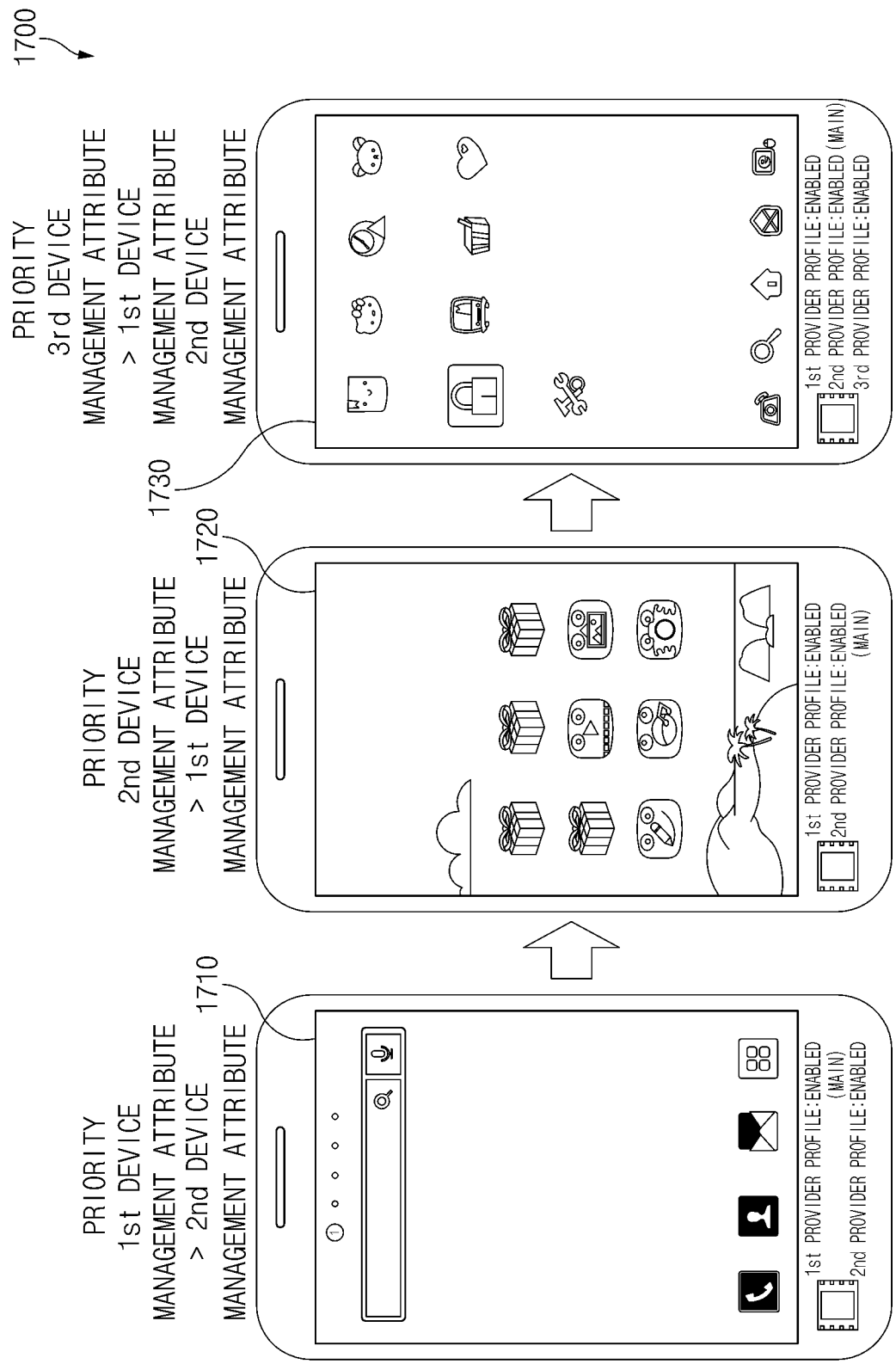
FIG. 17 is a diagram illustrating a user interface changed based on a priority of a device management attribute in an electronic device, according to an embodiment of the present disclosure.

FIG. 17 is a diagram illustrating a user interface changed based on a priority of a device management attribute in an electronic device, according to an embodiment of the present disclosure. Referring to FIG. 17, the electronic device may change a user interface based on a priority among pieces of information included in a device management attribute. The electronic device may include a first provider profile, a second provider profile, and/or a third provider profile. Furthermore, the electronic device may include a first device management attribute associated with the first provider profile, a second device management attribute associated with the second provider profile, and/or a third device management attribute associated with the third provider profile.

The electronic device may determine which of the first and second provider profiles is an enabled provider profile. In the case where a plurality of provider profiles are in an enabled state, the electronic device may confirm device management attributes associated with the enabled provider profiles respectively. The electronic device may display a user interface based on priorities in the device management attributes. For example, in the case where the priority of the first device management attribute associated with the first provider profile is higher than that of the second device management attribute associated with the second provider profile, the electronic device may display a user interface 1710 based on the first device management attribute. However, in the case where the priority of the second device management attribute associated with the second provider profile is higher than that of the first device management attribute associated with the first provider profile, the electronic device may display a user interface 1720 based on the second device management attribute.

The electronic device may change a user interface based on a change of the priorities of the device management attributes. For example, the electronic device may install the third provider profile while the first and second provider profiles are enabled. Once the third provider profile is installed, the third provider profile may be enabled. The electronic device may display a user interface based on a main provider profile among the first to third provider profile. In the case where the second provider profile is the main provider profile among the first to third provider profiles, the user interface displayed on the electronic device may be identical or similar to the user interface 1720. The priorities of the device management attributes included in the electronic device may be changed by a user input or an external device, and, in the case where the priority of the device management attribute associated with the third provider profile among the first to third provider profiles is changed, the user interface may be changed based on the priority. For example, in the case where the second provider profile is the main provider profile, if the priority of the third device management attribute associated with third provider profile is higher than that of the second device management attribute associated with the second provider profile, a user interface 1730 may be displayed based on the third device management attribute. The electronic device may display a user interface based on a priority of a device management attribute rather than a main provider profile. Alternatively, the electronic device may display a user interface based on a main provider profile rather than a priority of a device management attribute.

Figure 18:
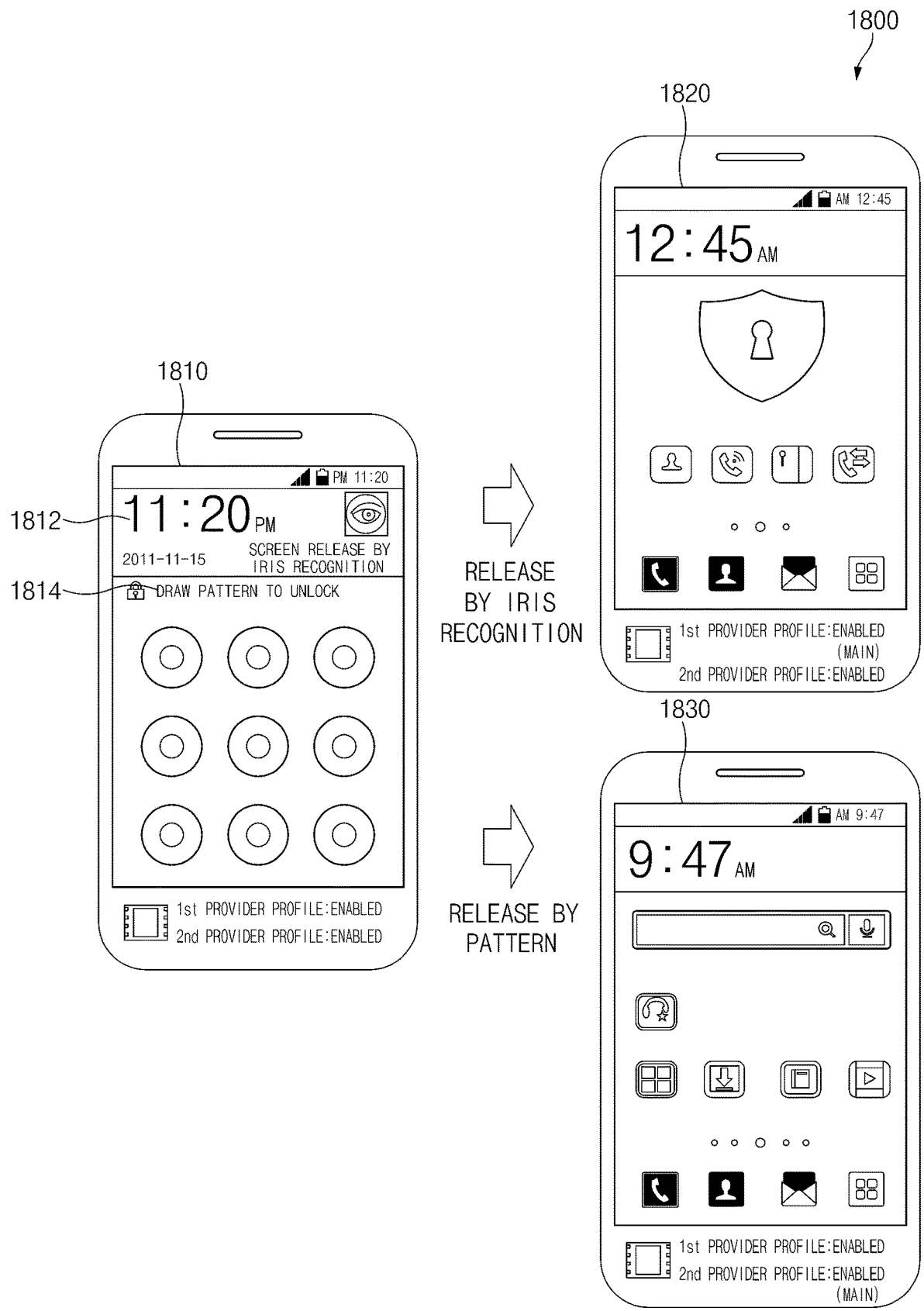
FIG. 18 is a diagram illustrating a user interface changed based on a security of a device management attribute in an electronic device, according to an embodiment of the present disclosure.

FIG. 18 is a diagram illustrating a user interface changed based on a security of a device management attribute in an electronic device, according to n embodiment of the present disclosure. Referring to FIG. 18, the electronic device may change a user interface based on a security among pieces of information included in a device management attribute. The electronic device may include a first provider profile and/or a second provider profile, and may include a first device management attribute associated with the first provider profile and/or a second device management attribute associated with the second provider profile. The security of the first device management attribute may be high, and the security of the second device management attribute may be low.

The electronic device may display a user interface 1810 (e.g., a lock screen user interface) based on the security among pieces of information included in the first device management attribute or the second device management attribute. For example, in the case where the security of the first device management attribute is high, the electronic device may display a high-level lock 1812 (e.g., an iris recognition lock), and, in the case where the security of the second device management attribute is low, the electronic device may display a low-level lock 1814 (e.g., a pattern lock). The electronic device may display at least one of the high-level lock 1812 or the low-level lock 1814 on the user interface 1810. The electronic device may display at least one of the high-level lock 1812 or the low-level lock 1814 on the user interface 1810 regardless of an enablement state of a provider profile (e.g., the first provider profile or the second provider profile) installed in the electronic device.

The electronic device may change a user interface based on a lock release (e.g., an iris recognition release or a pattern release) input to the electronic device. For example, in the case where the lock release is performed through the high-level lock 1812 (e.g., an iris recognition lock), the electronic device may set the first provider profile associated with the high-level lock as a main provider profile. Accordingly, the electronic device may display a user interface 1820 based on the first device management attribute associated with the first provider profile. Furthermore, in the case where the lock release is performed through the low-level lock 1814 (e.g., a pattern lock), the electronic device may set the second provider profile associated with the low-level lock as a main provider profile. Accordingly, the electronic device may display a user interface 1830 based on the second device management attribute associated with the second provider profile.

The electronic device may change a user interface based on a complexity of a lock release method set in the electronic device. The lock release method may include, for example, a pattern lock, a password lock, a fingerprint lock, or an iris lock. In the case where the pattern lock is used as the lock release method, the electronic device may determine the complexity of the lock release method based on the number of patterns used for the pattern lock. If the number of the patterns used for the pattern lock is large (e.g., greater than 3), the electronic device may determine that the complexity of the lock release method and/or a security level of the electronic device is high, or, if the number of the patterns used for the pattern lock is small (e.g., less than or equal to 3), the electronic device may determine that the complexity of the lock release method and/or the security level of the electronic device is low. If it is determined that the complexity of the lock release method is high, the electronic device may set the first provider profile associated with the high security level as a main provider profile. Accordingly, the electronic device may display a user interface based on the first device management attribute associated with the first provider profile. Likewise, if it is determined that the complexity of the lock release method is low, the electronic device may set the second provider profile associated with the low security level as a main provider profile. Accordingly, the electronic device may display a user interface based on the second device management attribute associated with the second provider profile.

The electronic device may change an enablement state of a provider profile installed in the electronic device based on the lock release input to the electronic device. Furthermore, the electronic device may display a user interface based on the changed enablement state. The electronic device may include an enabled first provider profile or a disabled second provider profile. The security of the first device management attribute associated with the first provider profile may be high, and the security of the second device management attribute associated with the second provider profile may be low. In the case where the lock release is performed through the low-level lock 1814, the electronic device may change the state of the second provider profile associated with the low-level lock from a disabled state to an enabled state. Furthermore, the electronic device may change the second provider profile to a main provider profile. Accordingly, the electronic device may display the user interface 1830 based on the second device management attribute associated with the second provider profile.

The lock release may be performed based on a user input (e.g., a touch or iris recognition) or information received from an external device.

Figure 19:
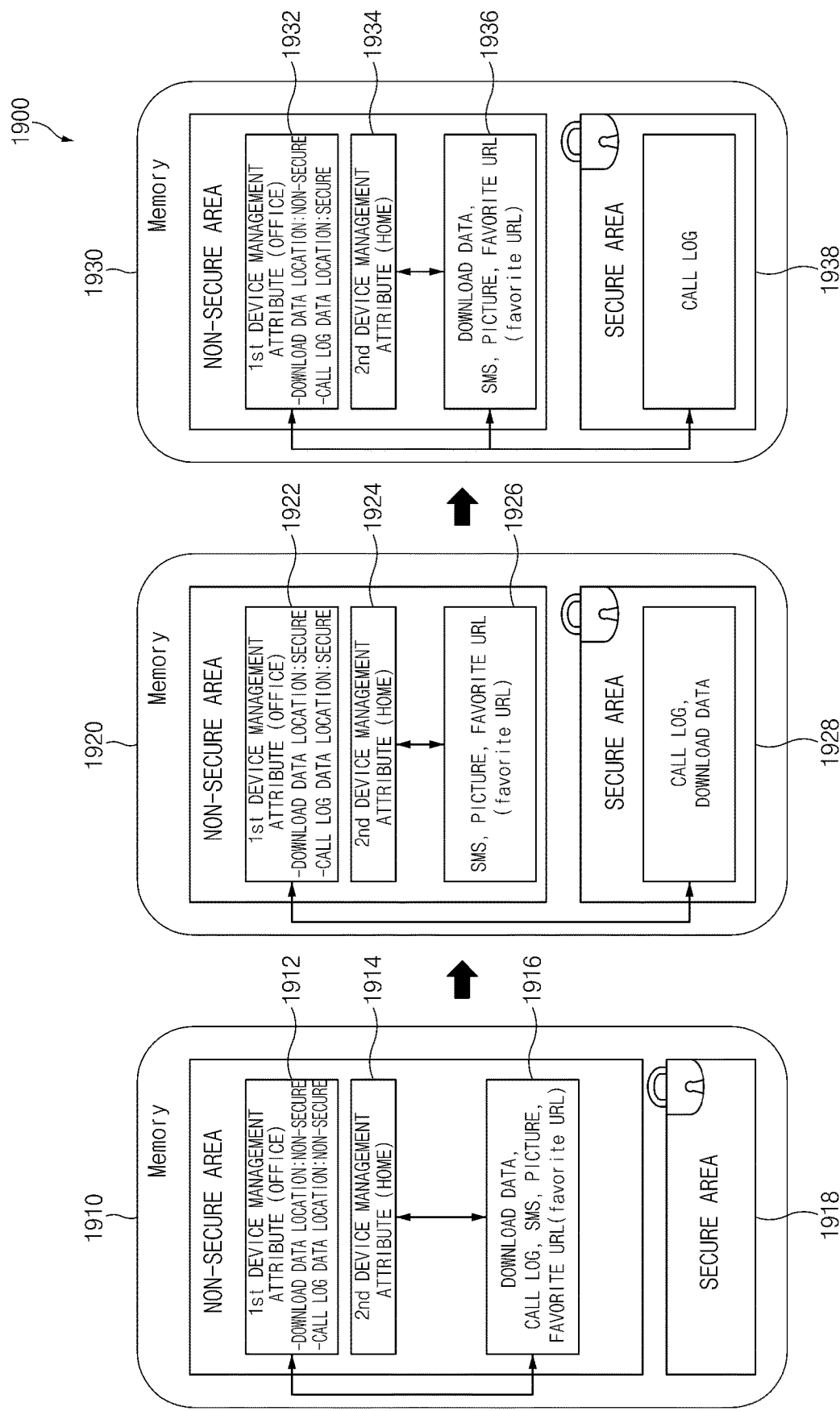
FIG. 19 is a diagram illustrating controlling data storage and access based on a device management attribute (security) in an electronic device, according to an embodiment of the present disclosure.

FIG. 19 is a diagram illustrating an example of controlling data storage and access based on a device management attribute (security) in an electronic device, according to an embodiment of the present disclosure. Referring to FIG. 19, the electronic device may control data storage and access based on a security among pieces of information included in a device management attribute. The electronic device may include first device management attributes 1912, 1922, and 1932 and second device management attributes 1914, 1924, and 1934, wherein the mode of the first device management attributes 1912, 1922, and 1932 may be an office mode and the mode of the second device management attributes 1914, 1924, and 1934 may be a home mode. Furthermore, the electronic device may store information (e.g., download data, a call log, an SMS message, an image, favorite uniform resource locator (URL), or the like) generated in the electronic device in a memory 1910, 1920, or 1930 (e.g., the memory 130 of FIG. 1 or the memory 230 of FIG. 2) operatively connected to the electronic device. Alternatively, the electronic device may store the information in one or more external devices (e.g., the electronic device 102 or 104 or the server 106) via a network 162 of FIG. 1. The memories 1910, 1920, and 1930 may include at least one of a non-secure or secure area 1918, 1928, or 1938, and the electronic device may control storage of data or access to data in the memories 1910, 1920, and 1930.

The electronic device may store the information (e.g., download data, a call log, an SMS message, an image, favorite URL, or the like) generated in the electronic device in at least one of the non-secure or secure areas 1918, 1928, or 1938 based on the mode (e.g., an office mode or a home mode) of the device management attribute (e.g., the first device management attributes 1912, 1922, or 1932 or the second device management attributes 1914, 1924, or 1934). For example, in the case where a first provider profile associated with the first device management attribute is performed in the electronic device, the electronic device may store information related to the first provider profile in a data storage area 1916 included in a non-secure area of the memory 1910. Download data, a call log, an SMS message, an image, a favorite URL, or the like generated while the first provider profile is in an enabled state may be stored in the data storage area 1916. In the case where a second provider profile associated with the second device management attribute 1914 is performed in the electronic device, the electronic device may allow a user to access the data storage area 1916 or may display a user interface for enabling the user to access the data storage area 1916.

The electronic device may add, to the first device management attribute 1912, a storage location (or path) of the information (e.g., download data, a call log, an SMS message, an image, favorite URL, or the like) generated in the electronic device. For example, the first device management attribute 1912 may include a storage location (e.g., the non-secure or secure area 1918) in which information included in the data storage area 1916 is stored within the data memory 1910. Since the download data and call log data among pieces of the information generated in the electronic device are stored in the data storage area 1916, the electronic device may add, to the first device management attribute 1912, a non-secure area that is information on a location in which the download data and the call log data are stored.

The electronic device may store the information (e.g., download data, a call log, an SMS message, an image, a favorite URL, or the like) generated in the electronic device in at least one of the non-secure or secure areas 1918, 1928, or 1938 based on the mode (e.g., an office mode or a home mode) of the device management attribute (e.g., the first device management attributes 1912, 1922, or 1932 or the second device management attributes 1914, 1924, or 1934). For example, in the case where the first provider profile associated with the first device management attribute is performed in the electronic device, the electronic device may store information related to the first provider profile in a data storage area 1926 included in a non-secure area of the memory 1920. An SMS message, an image, a favorite URL, or the like generated while the first provider profile is in an enabled state may be stored in the data storage area 1926. Furthermore, download data and call log data may be stored in the secure area 1928. In the case where the second provider profile associated with the second device management attribute 1924 is performed in the electronic device, the electronic device may allow a user to access the data storage area 1926 or may display a user interface for enabling the user to access the data storage area 1926. On the contrary, the electronic device may prohibit the user from accessing the secure area 1928.

The electronic device may add, to the first device management attribute 1922, a storage location (or path) of the information (e.g., download data, a call log, an SMS message, an image, favorite URL, or the like) generated in the electronic device. For example, the first device management attribute 1922 may include a storage location (e.g., the non-secure or secure area 1928) in which information included in the data storage area 1926 is stored within the data memory 1920. Since the download data and call log data among pieces of the information generated in the electronic device are stored in the secure area 1928, the electronic device may add, to the first device management attribute 1922, a secure area that is information on a location in which the download data and the call log data are stored.

The electronic device may store the information (e.g., download data, a call log, an SMS message, an image, a favorite URL, or the like) generated in the electronic device in at least one of the non-secure or secure areas 1918, 1928, or 1938 based on the mode (e.g., an office mode or a home mode) of the device management attribute (e.g., the first device management attributes 1912, 1922, or 1932 or the second device management attributes 1914, 1924, or 1934). For example, in the case where the first provider profile associated with the first device management attribute is performed in the electronic device, the electronic device may store information related to the first provider profile in a data storage area 1936 included in a non-secure area of the memory 1930. Download data, an SMS message, an image, a favorite URL, or the like generated while the first provider profile is in an enabled state may be stored in the data storage area 1936. Furthermore, call log data may be stored in the secure area 1938. The electronic device may move the download data stored in the secure area 1928 of the memory 1920 to the data storage area 1936 included in the non-secure area of the memory 1930. The electronic device may store, simultaneously or separately, in the data storage area 1936 and the secure area 1938, the download data generated while the first provider profile is in an enabled state. In the case where the second provider profile associated with the second device management attribute 1934 is performed in the electronic device, the electronic device may allow a user to access the data storage area 1936 or may display a user interface for enabling the user to access the data storage area 1936. On the contrary, the electronic device may prohibit the user from accessing the secure area 1938.

The electronic device may add, to the first device management attribute 1932, a storage location (or path) of the information (e.g., download data, a call log, an SMS message, an image, a favorite URL, or the like) generated in the electronic device. For example, the first device management attribute 1932 may include a storage location (e.g., the non-secure or secure area 1938) in which information included in the data storage area 1936 is stored within the data memory 1930. Since the download data among pieces of the information generated in the electronic device is stored in the data storage area 1936 of the non-secure area, the electronic device may add, to the first device management attribute 1932, a non-secure area that is information on a location in which the download data is stored, and, since the call log data is stored in the secure area 1938, the electronic device may add, to the first device management attribute 1932, a secure area that is information on a location in which the call log data is stored.

Figure 20:
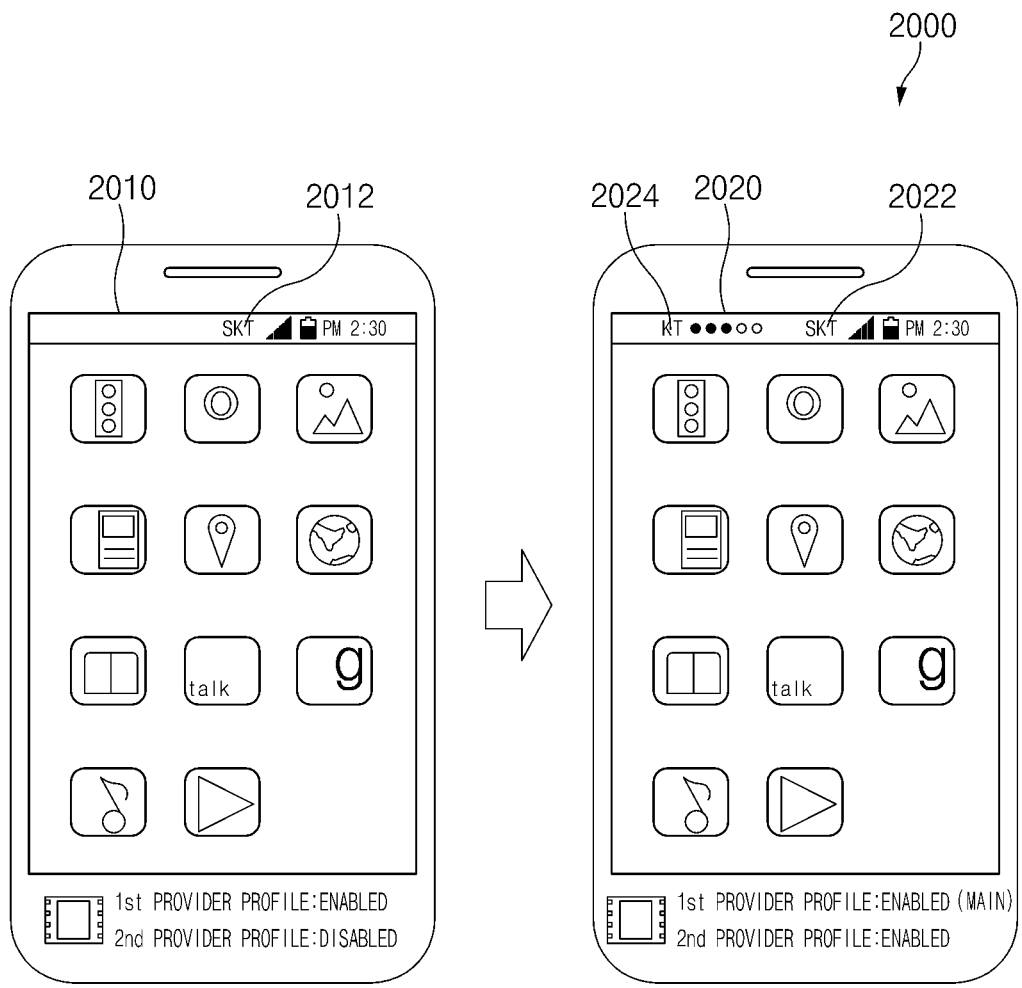
FIGS. 20-21B are diagrams illustrating a user interface for displaying an indicator related to a device management attribute in an electronic device, according to an embodiment of the present disclosure.
Figure 21A:
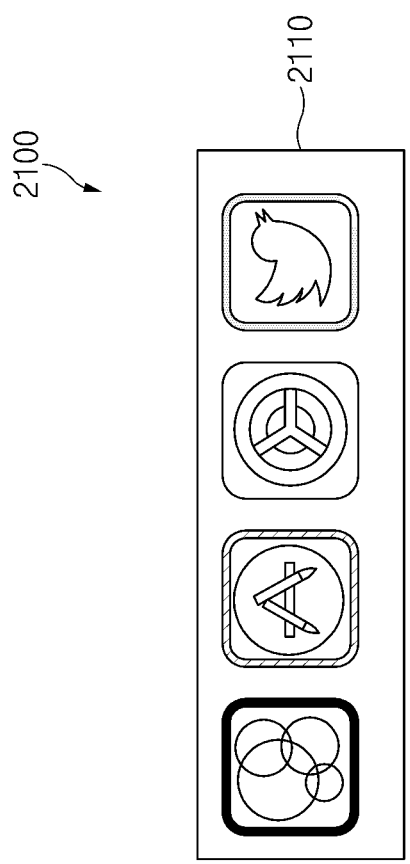
Figure 21B:
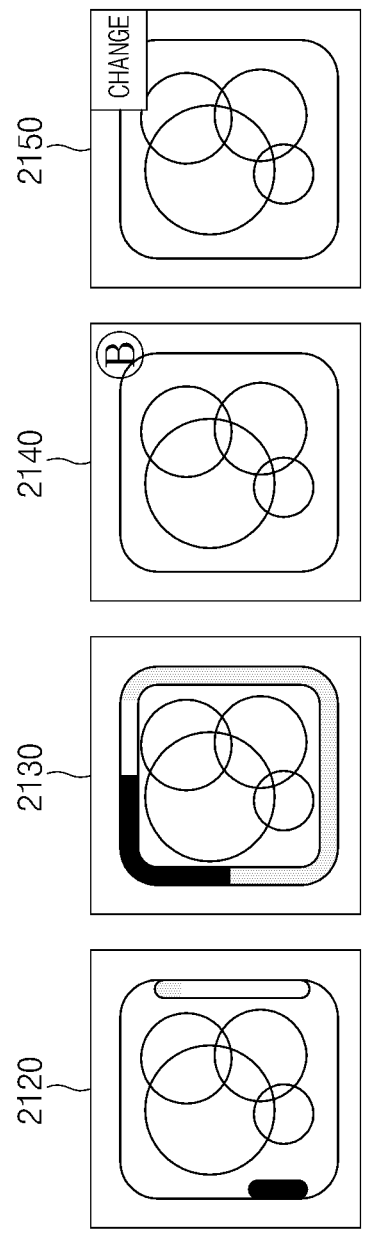

FIGS. 20-21B are diagrams illustrating a user interface for displaying an indicator related to a device management attribute in an electronic device, according to an embodiment of the present disclosure. Referring to FIG. 20, the electronic device may change an image (e.g., an icon or a widget) displayed on a user interface based on a provider profile installed in the electronic device or a device management attribute associated with the provider profile. The electronic device may include a first device management attribute associated with a first provider profile and/or a second device management attribute associated with a second provider profile. The electronic device may provide, to a user, information related to a service (e.g., roaming, communications, map, navigation, market, ebook, mobile credit card, mobile wallet, or mobile transportation card) provided by a communications service provider (e.g., the MNO 570 of FIG. 5 or the third-party service provider 580 of FIG. 5), using the image as an indicator. Furthermore, the electronic device may include a first indicator 2012 or 2022 associated with the first provider profile or a second indicator 2024 associated with the second provider profile.

The electronic device may display the indicator based on a network state (e.g., a signal strength or a network congestion) associated with an enabled provider profile installed in the electronic device. For example, in the case where the first provider profile among a plurality of provider profiles is enabled, the electronic device may display, on a user interface 2010, the first indicator 2012 indicating the network state associated with the first provider profile. In the case where the second provider profile is also enabled, the electronic device may display, on a user interface 2020, the first indicator 2022 indicating the network state associated with the first provider profile and the second indicator 2024 indicating the network state associated with the second provider profile. In the case where a new provider profile (e.g., the second provider profile) is installed, the electronic device may display, on the user interface 2010 or 2020, the network state associated with the new provider profile while installing the new provider profile. Once the new provider profile is installed, the new provider profile may be enabled.

The electronic device may change an area where the indicator (e.g., the first indicator 2022 or the second indicator 2024) is displayed, based on the device management attribute (e.g., the first device management attribute or the second device management attribute). For example, the electronic device may change an order of displaying the first indicator 2012 or 2022 or the second indicator 2024 on the user interface 2010 or 2020. In the case where the first provider profile is set as a main provider profile, the electronic device may locate the first indicator 2012 or 2022 associated with the first provider profile on an upper end portion of the electronic device. Furthermore, the electronic device may locate the second indicator 2024 associated with the second provider profile on a lower end portion of the electronic device. Alternatively, the electronic device may display the first indicator 2012 or 2022 together with the second indicator 2024 on the upper end portion of the electronic device so that the first indicator 2012 or 2022 is positioned on an upper right side and the second indicator 2024 is positioned on an upper left side.

The electronic device may modify the indicator (e.g., the first indicator 2022 or the second indicator 2024) displayed on the user interface 2010 or 2020. For example, in the case where the network state associated with the first provider profile is better (e.g., larger numerical value) than that associated with the second provider profile, the electronic device may display the indicators such that the first indicator 2012 or 2022 of the first provider profile is greater than the second indicator 2024 of the second provider profile. The electronic device may be connected to an external device using a communication module (e.g., the communication module of FIG. 4) of the electronic device, and may display a user interface based on a network state for the external device operatively connected to the electronic device. For example, the electronic device may be connected to a plurality of external devices, and, if the network state for a first external device operatively connected to the electronic device is better (e.g., a shorter distance from the electronic device) than that for a second external device operatively connected to the electronic device, the electronic device may display the indicators such that the first indicator 2012 or 2022 associated with the first external device is greater than the second indicator 2024 associated with the second external device.

Referring to FIGS. 21A and 21B, the electronic device may determine an image (e.g., an icon or a widget) displayed on a user interface based on a provider profile installed in the electronic device or a device management attribute associated with the provider profile. The electronic device may display a user interface 2110 based on the first device management attribute associated with the first provider profile and/or the second device management attribute associated with the second provider profile. The first device management attribute or the second device management attribute may include a network state (e.g., a network bandwidth (BW), speed, signal strength, network congestion, or the like) associated with each of the first and second device management attributes. Furthermore, the electronic device may use the image as an indicator.

The electronic device may display the indicator based on the network state included in each of the first device management attribute and the second device management attribute. For example, according to the network state, the electronic device may change a color, luminosity, transparency, display position, or size of at least a part of the indicator, or content displayed on the at least a part of the indicator, or a visual effect for the content. In the case where the network state of the first device management attribute is better (e.g., wider, faster, or the like) than that of the second device management attribute, the electronic device may display the indicators such that the indicator associated with the first device management attribute has a darker color than that of the indicator associated with the second device management attribute. The electronic device may display lengths 2120 of the indicators or a ratio 2130 therebetween, or may display an additional character 2140 or 2150. For example, the electronic device may display the indicators such that the indicator of the device management attribute with a good network state is longer or occupies a larger portion of the indicator. Alternatively, the electronic device may display a change button or a name of another provider profile so that the other provider profile may be used instead of the provider profile being used in the electronic device.

The electronic device may display the indicators in various shapes. For example, the electronic device may display the indicators in the form of a circle, a quadrangle, a straight line, a curve, or the like.

Figure 22:
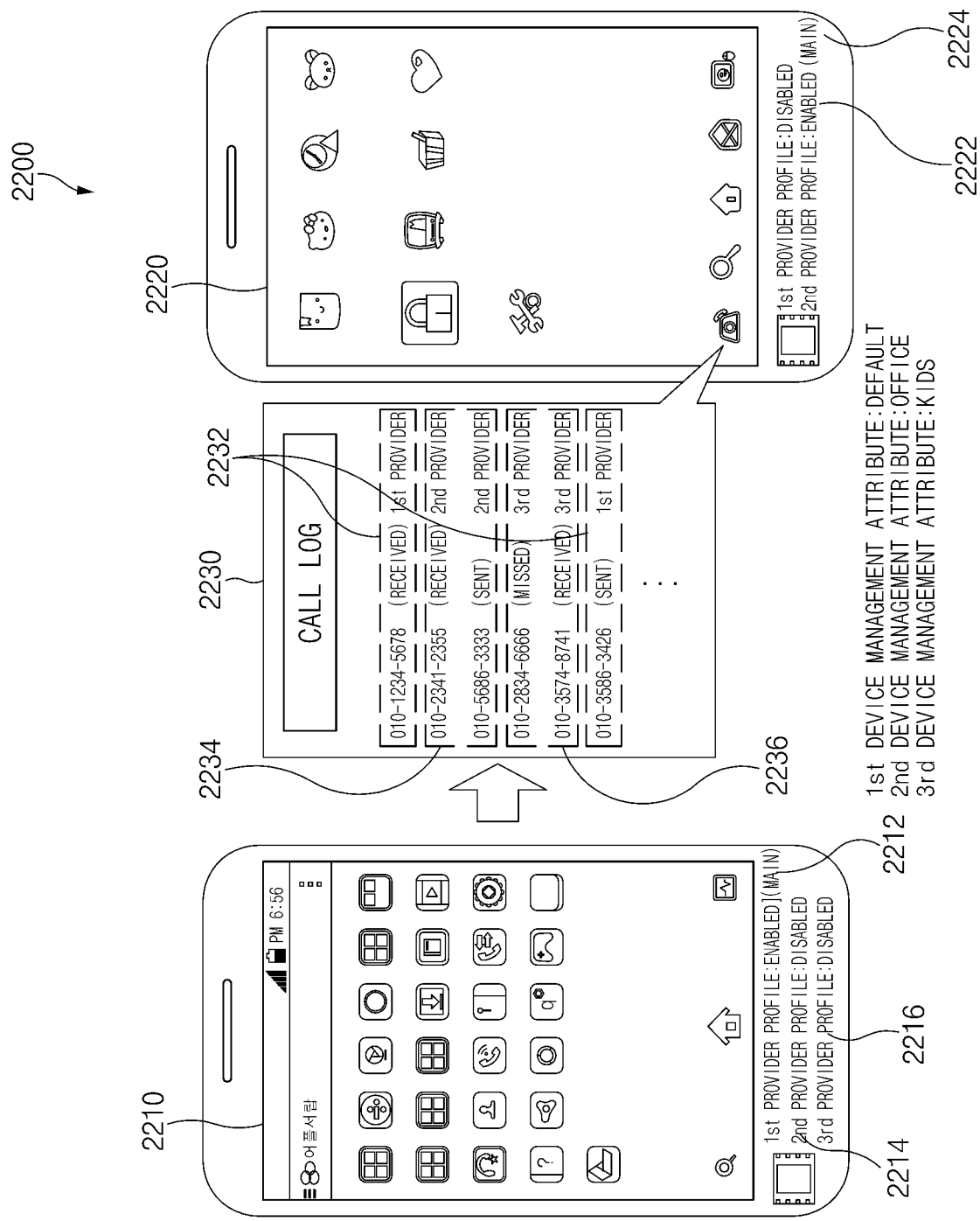
FIG. 22 is a diagram illustrating a user interface corresponding to a data storage area of a device management attribute in an electronic device, according to an embodiment of the present disclosure.

FIG. 22 is a diagram illustrating a user interface corresponding to a data storage area of a device management attribute in an electronic device, according to an embodiment of the present disclosure. Referring to FIG. 22, the electronic device may display a user interface based on a data storage area (e.g., the non-secure or secure areas 1918, 1928, or 1938 of FIG. 19) among pieces of information included in a device management attribute. Furthermore, the electronic device may control data access (through the user interface) by a user using a configuration or change of the user interface. The electronic device may include a first provider profile 2212 or 2222, a second provider profile 2214 or 2224, or a third provider profile 2216, and may include a first device management attribute associated with the first provider profile 2212 or 2222, a second device management attribute associated with the second provider profile 2214 or 2224, or a third device management attribute associated with the third provider profile 2216. Furthermore, the electronic device may include information (e.g., a call log 2230) generated in the electronic device, wherein the information generated in the electronic device may include first provider created information 2232, second provider created information 2234, or third provider created information 2236. The first-third provider created information 2232-2236 may be referred to as first-third information. Each of the first-third information may include a plurality of items, wherein the items may include information related to applications (e.g., a phone book application, a calendar application, a messaging application, an SMS application, a messenger application, an IMS application, or the like) installed in the electronic device.

The electronic device may change a user interface based on a main provider profile, and may determine a user interface displayed on the electronic device based on the data storage area. For example, the electronic device may display a user interface 2210 associated with the first provider profile 2212 that is enabled and is a main provider profile among the first-third provider profiles 2212, 2214, and 2216. Thereafter, the electronic device may display a user interface 2220 associated with the second provider profile 2224 that is enabled and is a main provider profile between the first and second provider profiles 2222 and 2224, based on a user input or information received from an external device. Furthermore, the electronic device may control access to information generated in the electronic device, based on a data storage area in a device management attribute included in the electronic device. The first-third provider created information 2232-2236 may be stored in a non-secure area (e.g., the non-secure area of FIG. 19). Since the first-third provider created information 2232-2236 are stored in the non-secure area, the electronic device may display, on a user interface, the first provider created information 2232 associated with the first provider profile 2222 which is disabled and the third provider created information 2236 associated with the third provider profile 2216 which is deleted from the electronic device together with the second provider created information 2234.

The electronic device may determine a user interface displayed on the electronic device based on the data storage area in the device management attribute regardless of existence of a provider profile that has been installed in the electronic device. For example, in the case where the third provider profile 2216 is deleted from the electronic device, the electronic device may determine whether to delete the third provider created information 2236 which is generated in the third provider profile 2216. Thereafter, if the third provider profile 2216 is deleted, but the third provider created information 2236 is not deleted, the electronic device may display the third provider created information 2236 on the user interface 2220.

Figure 23:
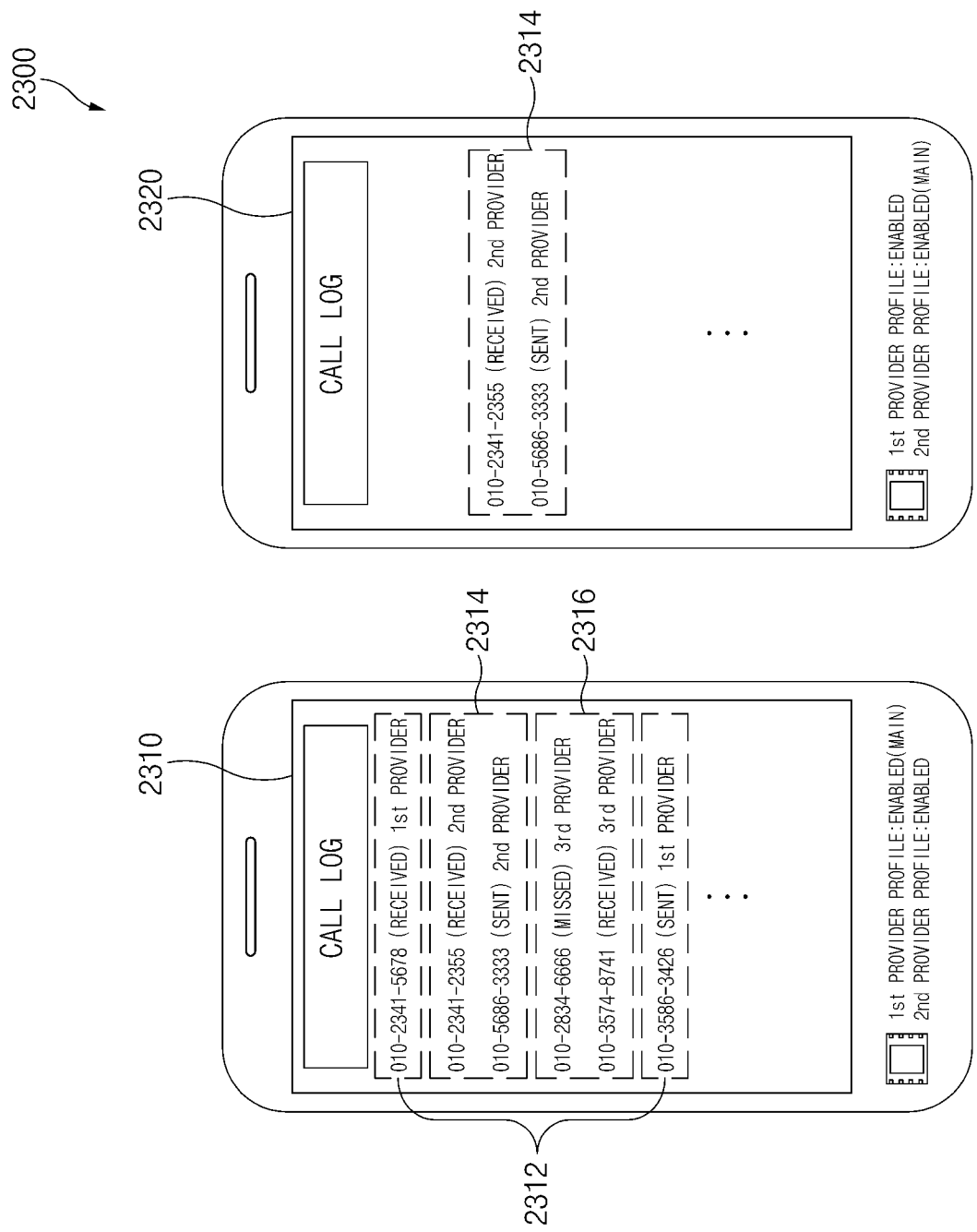
FIG. 23 is a diagram illustrating a user interface changed based on a data storage area of a device management attribute in an electronic device, according to an embodiment of the present disclosure.

FIG. 23 is a diagram illustrating a user interface changed based on a data storage area of a device management attribute in an electronic device, according to an embodiment of the present disclosure. Referring to FIG. 23, the electronic device may change a user interface according to a security level (e.g., high or low) of the data storage area. Furthermore, the electronic device may include first provider created information 2312 associated with a first provider profile, second provider created information 2314 associated with a second provider profile, and third provider created information 2316 associated with a third provider profile. The first-third provider created information 2312-2316 may be referred to as first-third information. Each of the first-third information may include a plurality of items, wherein the items may include information related to applications (e.g., a phone book application, a calendar application, a messaging application, an SMS application, a messenger application, an IMS application, or the like) installed in the electronic device.

In the case where information generated in the electronic device is stored in a secure area (e.g., the secure areas 1918, 1928, or 1938 of FIG. 19) among data storage areas (e.g., the non-secure or secure areas 1918, 1928, or 1938 of FIG. 19), the electronic device may control access to the information stored in the secure area. For example, in the case where the mode of the first device management attribute of the first provider profile is an office mode, the security of the first device management attribute may be set to be high, and information related to the first provider profile may be stored in the secure area. Furthermore, in the case where the mode of the second device management attribute of the second provider profile is a kids mode, the security of the second device management attribute may be set to be low, and information related to the second provider profile may be stored in a non-secure area. Furthermore, the third provider created information 2316 associated with the third provider profile which is deleted from the electronic device may be stored in the non-secure area since the third provider profile is not installed in the electronic device. Accordingly, in the case where the first provider profile is a main provider profile, the first provider created information 2312 may be stored in the secure area, and the second and third provider created information 2314 and 2316 may be stored in the non-secure area. Since the security of the first provider profile is high, the electronic device may simultaneously display, on a user interface 2310, the first provider created information 2312 stored in the secure area and the second and third provider created information 2314 and 2316 stored in the non-secure area.

In the case where a provider profile having a low security of a device management attribute becomes a main provider profile, the electronic device may control information displayed on a user interface 2320 among pieces of information generated in the electronic device. For example, in the case where the second provider profile that is enabled and is a main provider profile has a low security, the electronic device may not display, on the user interface 2320, the first provider created information 2312 generated in the first provider profile with a high security and the third provider created information 2316 generated in the deleted third provider profile. Furthermore, the electronic device may display, on the user interface 2320, the second provider created information 2314 generated in the second provider profile being used in the electronic device.

The electronic device may combine at least one of pieces of information (e.g., configuration information, a schedule, or a priority order, a security or mode associated with the provider profile information (e.g., a SIM), a configuration of the user interface, a list of applications associated with the communications service provider, a communication log generated in the electronic device, or contact information) included in the device management attribute so as to manage the user interface displayed on the electronic device. For example, the electronic device may display the user interface based on one of a combination of the mode and the security of the device management attribute, a combination of the priority order and the schedule, and a combination of the mode and the schedule. In the case of displaying the user interface based on the combination of the mode and the security, the electronic device may display a user interface related to the mode, and may display a user interface related to the security on at least a part of the user interface related to the mode.

At least a part of devices (e.g., modules or functions thereof) or methods (e.g., operations) described herein may be implemented as instructions stored in a non-transitory computer-readable storage medium in the form of a programming module. In the case where the instructions are performed by a processor (e.g., the processor 120), the processor may perform functions corresponding to the instructions. The non-transitory computer-readable storage medium may be, for example, the memory 130.

The non-transitory computer-readable storage medium may include a hard disk, a floppy disk, a magnetic medium (e.g., a magnetic tape), an optical medium (e.g., a compact disk read only memory (CD-ROM) and a digital versatile disc (DVD)), a magneto-optical medium (e.g., a floptical disk), or a hardware device (e.g., a read only memory (ROM), a random access memory (RAM), or a flash memory). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A storage medium stores instructions configured to instruct at least one processor to perform at least one operation when being executed by the at least one processor. The at least one operation may include receiving, in an electronic device, a plurality of pieces of subscriber identification module information including first subscriber identification module information corresponding to a first user interface and second subscriber identification module information corresponding to a second user interface, providing the first user interface through a display operatively connected to the electronic device, and changing at least a part of the first user interface to the second user interface based on the second subscriber identification module information, in response to a user input to the first user interface.

The module or program module described herein may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to a method and an electronic device described herein, a user interface may be modified or information to be displayed may be determined based on, for example, subscriber identity module information, so that a service provided by the electronic device may be efficiently used. Furthermore, the electronic device may share user interfaces with one or more other electronic devices through communication connections between the electronic device and the other electronic devices, and may configure or modify various user interfaces based on a user input, so that a user may execute a function and information desired by the user and the utilization of the electronic device may be improved through the user interfaces.

While the present disclosure has been shown and described with reference to certain embodiments thereof, it should be understood by those skilled in the art that many variations and modifications of the method and apparatus described herein will still fall within the spirit and scope of the present disclosure as defined in the appended claims and their equivalents.

The invention claimed is:

1. An electronic device comprising:
  a display;
  a memory configured to store plurality of subscriber identity module (SIM) information corresponding to a communication service provider that provides a network, the plurality of SIM information being received from an external device via the network; and
  a processor-implemented manager module operatively connected to the memory and configured to:
  generate device management attributes using the plurality of SIM information,
  store the device management attributes in the memory, and
  change, based on first SIM information among the plurality of SIM information, at least a part of a user interface to be displayed according to device management attribute corresponding to the first SIM information through a display operatively connected to the electronic device,
  wherein the SIM information comprises the first SIM information and second SIM information, and
  wherein the processor-implemented manager module is further configured to:
    display a lock user interface for a lock release of the electronic device on the display;
    receive a lock release input for release lock state of the electronic device through the lock user interface;
    in response to the lock release input, display a first user interface corresponding to the first SIM information when a lock release method of the lock release input corresponds to a first method among a plurality of lock release methods; and
    in response to the lock release input, display a second user interface corresponding to the second SIM information when the lock release method of the lock release input corresponds to a second method among the plurality of lock release methods,
  wherein a security level of the first method is different from the second method, and
  wherein the plurality of lock release methods include at least two or more of a password, a pattern, a fingerprint recognition, or an iris recognition.

2. The electronic device of claim 1, wherein the memory comprises:
  a first memory configured to store the plurality of SIM information; and
  a second memory configured to store the device management attribute for managing the user interface.

3. The electronic device of claim 2, wherein the device management attribute is generated based on the SIM information.

4. The electronic device of claim 2, wherein the device management attribute comprises at least one of configuration information, a schedule, a priority order to be applied to the electronic device, a security or mode associated with the SIM information, a configuration of the user interface, a list of applications associated with the communication service provider, and a communication log or contact information generated in the electronic device.

5. The electronic device of claim 1, wherein the processor-implemented manager module is further configured to transmit at least one of a device management attribute for managing the user interface or a text, an image, an icon, and a widget to be displayed through the at least the part of the user interface.

6. The electronic device of claim 1, wherein the user interface comprises at least one of a homepage, a background image, and an icon.

7. The electronic device of claim 1, wherein the processor-implemented manager module is further configured to change a color, a luminosity, a transparency, a display position, a size of the at least the part of the user interface, content displayed on the at least the part of the user interface, and a visual effect for the content.

8. The electronic device of claim 1, wherein the processor-implemented manager module is further configured to display at least one of a widget, an icon, an image, and a text, or to hide or delete the at least one of the widget, the icon, the image, and the text from one of a user's view and the user interface.

9. The electronic device of claim 1, wherein the user interface comprises an indicator indicating a strength of a signal received through the network, and
  wherein the processor-implemented manager module is further configured to display the indicator based on at least one of a congestion of the network, a location of the electronic device, a received signal strength, and the SIM information.

10. An electronic device comprising:
  a display:
  a subscriber identity module (SIM) card comprising a memory configured to store:
  first SIM information and second SIM information, each of the first SIM information and the second SIM information corresponds to a communication service provider that provides a network
  first device management attributes based on the first SIM information, and
  second device management attributes based on the second SIM information; and
  a processor-implemented manager module operatively connected to the memory and configured to:
    provide communication between the electronic device and an external device based on at least one of the first SIM information or the second SIM information,
    display a lock user interface for a lock release of the electronic device on the display;
    receive a lock release input for release lock state of the electronic device through the lock user interface:
    in response to the lock release input, display a first user interface corresponding to the first SIM information according to the first device management attribute when a lock release method of the lock release input corresponds to a first method among a plurality of lock release method, and
    in response to the lock release input, display a second user interface corresponding to the second SIM information according to the second device management attribute when the lock release method of the lock release input corresponds to a second method among the plurality of lock release methods, wherein a security level of the first method is different from the second method, and wherein the plurality of lock release methods include at least two or more of a password, a pattern, a fingerprint recognition, or an iris recognition.

11. The electronic device of claim 10, wherein the processor-implemented manager module is further configured to display the first information if the communication is provided based on the first SIM information and to display the second information if the communication is provided based on the second SIM information.

12. The electronic device of claim 10, wherein the processor-implemented manager module is further configured to:
generate the first device management attribute for managing a user interface displayed on the display based on the first SIM information,
generate the second device management attribute for managing the user interface displayed on the display based on the second SIM information, and
store the first device management attribute and the second device management attribute in the memory of the SIM card.

13. The electronic device of claim 10, wherein the first device management attribute corresponding to the first SIM information comprises at least one first item related to an application, and the second device management attribute corresponding to the second SIM information comprises at least one second item related to the application.

14. The electronic device of claim 10, further comprising a SIM interface configured to access the SIM card that stores at least one of the first SIM information and the second SIM information.

15. A method comprising:
receiving a plurality of subscriber identity module (SIM) information comprising first SIM information and second SIM information;
generating a first device management attribute based on the first SIM information;
generating a second device management attribute based on the second SIM information;
storing the first SIM information, the second SIM information, the first device management attribute, and the second device management attribute in a memory of a SIM card operatively connected to an electronic device;
displaying a lock user interface for a lock release of the electronic device on the display:
receiving a lock release input for release lock state of the electronic device through the lock user interface; and
in response to the lock release input, presenting a first user interface corresponding to the first device management attribute or a second user interface corresponding to the second device management attribute through a display operatively connected to the electronic device based on a lock release method of the lock release input,
wherein the presenting the first user interface comprises, displaying the first user interface when a lock release method of the lock release input corresponds to a first method among a plurality of lock release methods,
wherein the presenting the second user interface comprises, displaying the second user interface when a lock release method of the lock release input corresponds to a second method among a plurality of lock release methods,
wherein a security level of the first method is different from the second method, and
wherein the plurality of lock release methods include at least two or more of a password, a pattern, a fingerprint recognition, or an iris recognition.

16. The method of claim 15, wherein presenting the first user interface comprises adjusting the first user interface based on the first device management attribute, the first SIM information, and a strength of a signal received through a network corresponding to the first SIM information.

17. The method of claim 15, wherein the first device management attribute comprises at least one first item related to an application, and the second device management attribute comprises at least one second item related to the application.

* * * * *